US010922881B2

(12) United States Patent
Tran et al.

(10) Patent No.: US 10,922,881 B2
(45) Date of Patent: Feb. 16, 2021

(54) THREE DIMENSIONAL/360 DEGREE (3D/360°) REAL-TIME FULL INFORMATION SMART MANAGEMENT INTEGRATED MAPPING SYSTEM (SMIMS) AND PROCESS OF GENERATING THE SAME

(71) Applicants: Hao Duy Tran, Ho Chi Minh (VN); Thanh Dai Phan, Tuy Hoa (VN); Tuan Minh Le, Ha Noi (VN)

(72) Inventors: Hao Duy Tran, Ho Chi Minh (VN); Thanh Dai Phan, Tuy Hoa (VN); Tuan Minh Le, Ha Noi (VN)

(73) Assignee: STAR GLOBAL EXPERT SOLUTIONS JOINT STOCK COMPANY, Ho Chi Minh (VN)

( * ) Notice: Subject to any disclaimer, the term of this patent is extended or adjusted under 35 U.S.C. 154(b) by 0 days.

(21) Appl. No.: 16/178,620

(22) Filed: Nov. 2, 2018

(65) Prior Publication Data
US 2020/0167992 A1    May 28, 2020

(51) Int. Cl.
| | | |
|---|---|---|
| G06T 17/05 | (2011.01) | |
| G06T 3/40 | (2006.01) | |
| G06T 7/00 | (2017.01) | |
| G01C 21/32 | (2006.01) | |
| G06F 16/29 | (2019.01) | |
| G06F 3/0482 | (2013.01) | |

(52) U.S. Cl.
CPC .............. *G06T 17/05* (2013.01); *G01C 21/32* (2013.01); *G06F 16/29* (2019.01); *G06T 3/4038* (2013.01); *G06T 7/97* (2017.01); *G06F 3/0482* (2013.01); *G06T 2200/24* (2013.01)

(58) Field of Classification Search
CPC ...................................................... G06T 17/05
USPC ........................................................ 715/764
See application file for complete search history.

(56) References Cited

U.S. PATENT DOCUMENTS

| | | | | |
|---|---|---|---|---|
| 5,161,886 A | * | 11/1992 | De Jong ................. | G06T 15/10 701/458 |
| 5,259,037 A | * | 11/1993 | Plunk ..................... | G01C 11/02 382/154 |
| 5,945,926 A | * | 8/1999 | Ammar ................. | G01S 13/953 340/970 |
| 6,037,914 A | * | 3/2000 | Robinson ........... | G02B 27/0101 345/7 |
| 6,064,749 A | * | 5/2000 | Hirota ..................... | G06F 3/011 345/7 |
| 6,175,343 B1 | * | 1/2001 | Mitchell .............. | G02B 27/017 345/7 |

(Continued)

*Primary Examiner* — Reza Nabi

(57) ABSTRACT

A smart management integrated mapping system (SMIMS) having the capability of displaying real-time properties and controlling network-based devices in a geographical area is disclosed which comprises: generating a 3D/360° map of the geographical area using at least one imaging devices; generating and storing real-time properties associated with the plurality of objects into a storage via a network; selecting and matching the real-time properties to each of the first plurality of objects; embedding the real-time properties into a plurality of objects; rendering the real-time properties into displayable images; and displaying the real-time properties at a particular observation point when a user selects that particular object.

20 Claims, 12 Drawing Sheets

(56) References Cited

U.S. PATENT DOCUMENTS

| | | | | |
|---|---|---|---|---|
| 6,208,933 | B1* | 3/2001 | Lazar | G01C 21/20 342/357.31 |
| 6,289,277 | B1* | 9/2001 | Feyereisen | G01C 21/005 701/528 |
| 6,411,266 | B1* | 6/2002 | Maguire, Jr. | G06F 3/011 345/8 |
| 6,500,008 | B1* | 12/2002 | Ebersole | A62C 99/0081 345/441 |
| 6,734,896 | B2* | 5/2004 | Nobori | B60R 1/00 348/148 |
| 6,919,867 | B2* | 7/2005 | Sauer | H04N 13/239 345/8 |
| 7,148,861 | B2* | 12/2006 | Yelton | G06T 15/04 345/8 |
| 7,161,616 | B1* | 1/2007 | Okamoto | G06T 3/4038 348/148 |
| 7,162,054 | B2* | 1/2007 | Meisner | G01S 5/16 348/169 |
| 7,228,230 | B2* | 6/2007 | Hirokawa | G01C 21/165 342/357.31 |
| 7,274,380 | B2* | 9/2007 | Navab | G01S 5/16 345/633 |
| 7,301,547 | B2* | 11/2007 | Martins | G06T 19/00 345/419 |
| 7,343,232 | B2* | 3/2008 | Duggan | G05D 1/0061 244/75.1 |
| 7,480,566 | B2* | 1/2009 | Laverty | G01C 21/3679 340/990 |
| 7,502,688 | B2* | 3/2009 | Hirokawa | G01C 21/165 342/357.31 |
| 7,583,275 | B2* | 9/2009 | Neumann | G06T 17/00 345/419 |
| 7,693,702 | B1* | 4/2010 | Kerner | G06F 3/011 703/22 |
| 7,920,071 | B2* | 4/2011 | Baillot | G05D 1/0027 340/937 |
| 7,925,391 | B2* | 4/2011 | Sanders-Reed | G06F 3/14 701/3 |
| 8,400,507 | B2* | 3/2013 | Grigsby | G06K 9/00711 348/149 |
| 2003/0165255 | A1* | 9/2003 | Yanagawa | G06T 3/00 382/104 |
| 2003/0210832 | A1* | 11/2003 | Benton | G06T 15/20 382/284 |
| 2004/0028258 | A1* | 2/2004 | Naimark | G06K 9/4609 382/103 |
| 2004/0104935 | A1* | 6/2004 | Williamson | G06T 15/20 715/757 |
| 2004/0105573 | A1* | 6/2004 | Neumann | G06T 17/00 382/103 |
| 2004/0119662 | A1* | 6/2004 | Dempski | G02B 27/017 345/8 |
| 2004/0263514 | A1* | 12/2004 | Jin | G06K 9/0063 345/440 |
| 2005/0031169 | A1* | 2/2005 | Shulman | G06F 16/51 382/104 |
| 2005/0195096 | A1* | 9/2005 | Ward | G01C 21/32 340/995.14 |
| 2007/0016372 | A1* | 1/2007 | Browne | G01C 21/005 701/469 |
| 2007/0106434 | A1* | 5/2007 | Galbraith, II | B61L 25/08 701/19 |
| 2007/0273557 | A1* | 11/2007 | Baillot | G05D 1/0033 340/988 |
| 2008/0009969 | A1* | 1/2008 | Bruemmer | G05D 1/0027 700/245 |
| 2008/0147325 | A1* | 6/2008 | Maassel | G06T 17/05 702/5 |
| 2008/0218331 | A1* | 9/2008 | Baillot | G08B 13/19621 340/521 |
| 2008/0221745 | A1* | 9/2008 | Diamandis | B64D 27/023 701/3 |
| 2008/0266324 | A1* | 10/2008 | Lynch | G01C 21/20 345/634 |
| 2009/0073034 | A1* | 3/2009 | Lin | G01S 19/49 342/357.32 |
| 2010/0292874 | A1* | 11/2010 | Duggan | B64C 39/024 701/11 |
| 2010/0313146 | A1* | 12/2010 | Nielsen | G06T 19/006 715/757 |
| 2017/0103571 | A1* | 4/2017 | Beaurepaire | G01C 21/3667 |
| 2018/0302569 | A1* | 10/2018 | Cabral | H04N 5/232939 |
| 2019/0303648 | A1* | 10/2019 | Zhai | G01N 33/0062 |
| 2020/0109954 | A1* | 4/2020 | Li | G05D 1/0274 |
| 2020/0167992 | A1* | 5/2020 | Tran | G01C 21/32 |

* cited by examiner

THREE DIMENSIONAL/360 DEGREE (3D/360°) REAL-TIME FULL INFORMATION SMART MANAGEMENT INTEGRATED MAPPING SYSTEM (SMIMS) AND PROCESS OF GENERATING THE SAME

FIELD OF THE INVENTION

The present invention relates generally to the field of three-dimensional (3D) mapping of a geographical area using a combination of terrestrial 3D laser scanning technology, aerial unmanned aerial vehicle (UAV) imagery and photogrammetry technique. More specifically, the present invention relates to a system and process of generating and managing a real-time 3D/360° degree mapping of a geographical area having the capability of obtaining and displaying full-information of objects and of interactively controlling network-based devices located therein.

BACKGROUND ART

In two-dimensional (2D) maps, description data and videos of an exact location can be achieved by using the coordinates (x,y,z) of each pixel in the 2D video that allow a client to pinpoint the exact location of any object in the 2D maps. In addition, description data of each constituent object in 2D maps can be achieved in real-time using either a self-localization robot with a bearing-range sensor or a GIS (geographic information system). However, 2D maps are not easy to visualize and they become less popular in many applications that require depths and heights of the objects.

Three-dimensional (3D) maps on which objects are displayed three-dimensionally are highly convenient and becomes more popular because it is easier to visualize a three-dimensional shape of a constituent object—which includes a building, a warehouse, and an office, etc. Some prior-art 3D maps even go further to attach the description data of a constituent object when a user moves the cursor to select that particular constituent object. However, since the property data are not real-time, the users cannot know the current status of that particular constituent object. Property data is referred to as the description (total area, width, and height), ownership, age, encumbrances, etc., as well as any information that a client wants to know about that particular constituent object.

In the U.S. Pat. No. 8,525,827 to Boersma et al., a method of generating a 3D map system (the '827 patent') is disclosed. The 3D map in the '827 patent is obtained by integrating a 2D Geographic Information System (2D GIS) with a 3D visualization system through interfaces that provide for 3D visualization of the 2.5D GIS data. The interactive control of the 2D GIS system from 3D windows containing 3D renderings produced by the 3D visualization is also generated. The end product is a 3D map generated from the vertical expansion of the z coordinate (or elevation) of the 2.5D GIS data. In the '827 patent, a user can view, make measurements, or modify a building or a section of the 3D map. However, the views and measurements of the selected building in the 3D map of the '827 patent are not real-time. This is because the 2.5D GIS data are recorded with the original 2D GIS map. As such, to update a 3D map, the original 2D GIS has to be regenerated and clients have to purchase the update version of the 3D map. Furthermore, in the '827 patent, 3D maps are generated from 2D GIS and therefore they are not as realistic and lively as maps generated from 3D scanners, i.e. many details such as boundaries, edges, and minutae details such as electrical boxes, faucets cannot be modeled and displayed.

The Environmental System and Research Institute, Inc. (ESRI) attempts to integrate real-time GIS with the Internet of Things (IoT) from myriads of sensors to collect location data and store them in a big spatial temporal data storage. Then, continuous analytics can be performed to find meaningful patterns in retails, consumer behaviors, logistics such as the United Parcel Services' ORION, and smart cities. The real-time GIS with internet product of ESRI includes both 2D mapping and 3D mapping. The 2D mapping is done on a desktop application like ArcMap in which a map contains multiple layers such as feature layer, raster layer. Then a renderer encapsulates datasheets and symbols associated with a layer so that viewers can see IoT data at a particular point on the 2D map. The 3D mapping is done on apps like ArcScene and ArcGlobe which also has datasheet and symbols encapsulated in a feature layer and a raster layer. This product has too many apps to learn and update. It also lacks synchronization between 2D maps and scenes, and is limited reusability of layers, renders, and symbols.

In another attempt to improve its products, ESRI combines 2D and 3D mappings in one API environment in order to eliminate the above problems. Real-time GIS and continuous data from sensors are analyzed and streamlined in the GeoEvent. The results are stored in a high volume storage and uploaded to an ArcGIS server where the map service section and the feature service section are combined and sent to customers via webshares, desktops, or devices. However, the integration of the 3D mappings and real-time data by ESRI are cumbersome because they involve too many layers, too many computational phases, and a large storage. Consequently, the ESRI system is expensive. Furthermore, the 3D map created from 2D layer in one API environment is still not lively and realistic even when the raster layer is used. Consequently, 3D maps of ESRI are not feasible for applications involving limited areas such as small industrial sites, buildings, mini-malls, small factories, etc. because of the cost and complexity of ESRI's 3D mapping and assembling methods.

Even though ESRI uses the Internet of Things (IoT) to perform prescriptive analytics on data points, their IoT-based 3D maps cannot control different devices for different clients. In other words, the ESRI's 3D system is incapable of connecting to clients' internet to control the operations of the clients' devices. For example, the ESRI's 3D maps can be implemented in smart cities to find available parking spots and to take away full trash bins. The IoT-driven smart cities disclosed by ESRI are built entirely by the ESRI's systems and databases such as the ARCGIS server. Thereby, ESRI's IoT-driven technology can neither control nor employ existing clients' databases to perform real-time actionable intelligence such as turning on/off light posts to provide extra safety for people in a large parking lot. Thus, ESRI's system lacks flexibility and controllability. Furthermore, real-time and most updated description data must be provided by the next version of the ESRI application. Thus, ESRI system lacks accessing and updating of the existing clients' databases.

Therefore what is needed is a 3D mapping and management system that has the capability of generating accurate, lively, and photo-realistic 3D scenes with real-time information associated with every feature located inside the 3D maps.

In addition, what is needed is a 3D mapping and management system that is a simple, cost effective, and flexible plug-and-play system that can access and communicate with existing clients' databases to obtain real-time and update information without having to wait and purchase the next upgraded version of the system.

What is needed is a 3D mapping and management system that can interactively control clients' network-based devices.

Yet what is needed is a 3D mapping and management system that is simple to use so that it can be used to scan and create 3D models for all small, medium, and large geographical areas.

Furthermore, what is needed is a 3D mapping and management system that has the capability of generating a real-time 3D scenes (or maps) with real-time information associated with each feature inside a real-time 3D scene.

SUMMARY OF THE INVENTION

Accordingly, an aspect of the present invention is to provide a 3D/360° smart management integrated mapping module (3D/360° SMIM) capable of generating a three-dimensional-360 degrees)(3D/360° map of a geographical area, displaying real-time full information of a plurality of objects, and controlling network-based devices is disclosed which comprises: generating a 3D/360° still map of the geographical area using at least one imaging devices; obtaining real-time properties associated with the plurality of objects by accessing to the clients' databases and store the real-time properties into a storage medium via a network; enabling the controlling operations of the plurality of objects via the network; selecting and matching the real-time properties to each of the plurality of objects; embedding the real-time properties into a plurality of observation points located within the 3D/360° map; rendering the real-time properties into displayable images; and displaying the real-time properties of an object when a user selects that particular object.

Another aspect of the present invention is to provide a hardware SMIM module configured to: (1) generate a three-dimensional-360 degrees)(3D/360° map of a geographical area (2) display real-time full information of a plurality of objects, and (3) control network-based devices located therein. The hardware SMIM module comprises: a data retriever module configured to frequently access and retrieve property data from databases; a data converter module configured to convert the acquired property data into displayable images; a data embedder module configured to embed displayable real-time properties into objects within the 3D/360° map; a data controller module configured to control the operations of network-based devices located within the 3D/360° map; a 3D/360° interactive manager module configured to enable clients to perform the above-listed functions; and a data analytics and display module configured to display the real-time properties and perform data analytics of an objects when a user selects that particular object.

Yet another aspect of the present invention is to provide a computer software program stored in a non-transitory memory of a computer. The computer software program is configured to execute an image process that generates and display a graphic user interface (GUI) image on a display screen of that computer; display an interactive 3D/360 map of a geographical area including a plurality of observation points; display real-time properties associated with of the plurality of objects; and control the operations of network-based devices when a clients selects a particular object.

All the above aspects of the present invention achieve the following features and objectives:

A 3D/360° smart management interactive and mapping system (SMIMS) that has the capability of generating a real-time 3D/360° map with real-time information associated with each feature inside the real-time 3D/360° map.

A 3D/360° SMIMS that has the capability of generating a real-time 3D/360° map as well as real-time property information obtained from network-based sensors or from the Internet of Things (IoT) devices.

A 3D/360° SMIMS capable of accessing existing various clients' databases including asset databases, operational databases, and system databases to retrieve the most up to date property data without the need to purchasing an upgraded version.

A 3D/360° SMIMS capable of integrating with clients' programmable logic controllers (PLC), a supervisory control and data acquisition (SCADA) software, microcontrollers, PLGA (programmable logic gate array), or any wireless controllers so that the SMIMS of the present invention can control and acquire data from the clients' network-based sensors and devices such as lighting devices, cameras, actuators, 3D laser scanners, etc.

A 3D/360° SMIMS capable of having the flexibility in package installation and plug-and-play operation so that the 3D mapping and management system of the present invention can be hosted and ran on any computer device within the network.

A 3D/360° SMIMS capable of integrating with blockchains and artificial intelligence (AI).

A 3D/360° SMIMS that allows clients and developers to create 3D enterprise resource planning (ERP) platform and smart management.

A 3D/360° SMIMS capable of setting up users' right classifications and portfolio management.

A 3D/360° SMIMS capable of applying artificial intelligence (AI) engine such as computer vision, machine learning (ML), deep learning to perform auto-detection from real-time cameras and/or other imaging devices for security, fire detection, motion detection, and/or other useful purposes such as High Definition Survey (HDS), reality capture, volumetric surveys, facility management, marketing and proposals, forensics and security planning, education and entertainment, civil infrastructure, industrial applications, and heritage archeology.

A 3D/360° SMIMS capable of tracking real-time location/movement of people and/or machines, equipments, objects within the covered geographical area by accessing GPS and/or other sensing devices from a user's mobile devices.

A 3D/360° SMIMS configured to use QR code to obtain easy navigation and augmented reality (AR).

A 3D/360° real-time full information smart management integrated mapping system (SMIMS) capable of providing voice commands so that hand-free control and user convenience can be achieved.

These and other advantages of the present invention will no doubt become obvious to those of ordinary skill in the art after having read the following detailed description of the exemplary embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the exemplary embodiments of the invention, examples of which are illustrated in the accompanying drawings. While the invention will be described in conjunction with the exemplary embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
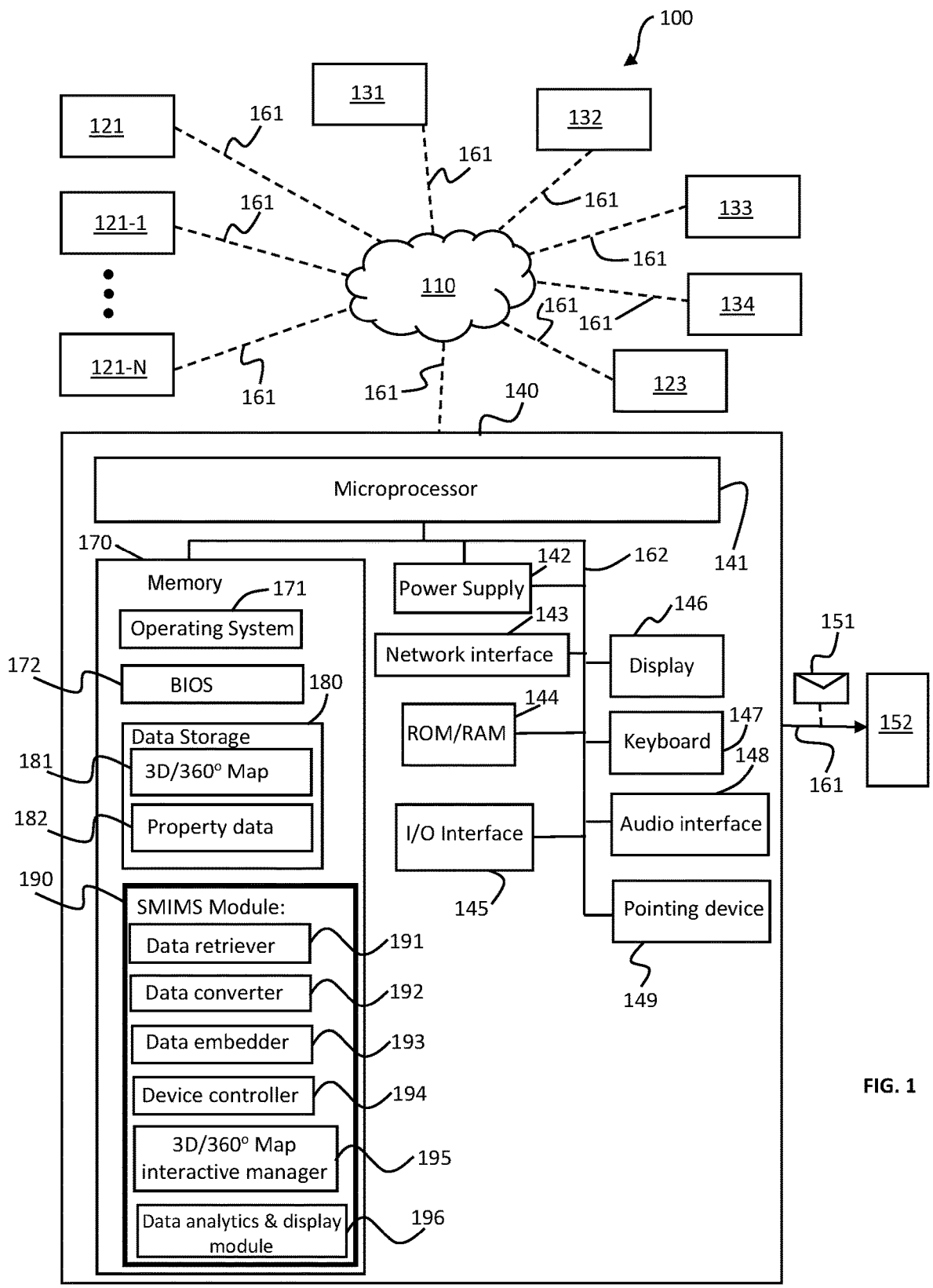
FIG. 1 is a schematic diagram of a network system including computer network computer with a three-dimensional/360° degree smart management integrated mapping system (SMIMS) capable of providing a 3D/360° map, obtaining and displaying real-time full information of objects located therein, and controlling network-based devices found within such map in accordance with an exemplary embodiment of the present invention.

Many aspects of the present invention are now described with reference to FIG. 1-FIG. 12. FIG. 1 illustrates a schematic diagram of a computer network system having a network computer with a 3D/360° real-time full information smart management integrated mapping system (SMIMS) capable of obtaining and displaying real-time properties of objects and controlling network-based devices in accordance with an exemplary embodiment of the present invention.

In one embodiment of the present invention, computer network system 100 includes a group of client computers 121-1, 121-2, . . . 121-N, at least one mobile devices 152 that are connected to a network 110 via communication channels 161. On the other side, at least one cameras 131, at least one lighting devices 132, and at least one video recording devices 133, at least one sensors 134, clients' existing databases 123 are also connected to network 110 via communication channels 161. Also connected to network 110 is a server computer 140. As shown in FIG. 1, server computer 140 includes a microprocessor 141 in communication with a memory 170 via a bus 162. Server computer 140 also includes a power supply 142, a network interface 143, cache memory 144, an input/output interface 145, a display 146, a keyboard 147, audio interface 148, and a pointing device driver 149. Power supply 142 provides power to server computer 140.

It will be noted that computer network system 100 can be connected as a cluster computing system in which all devices listed above are linked together as a single logical unit to perform the functions of the 3D/360° real-time full information smart management integrated mapping system (SMIMS) of the present invention. Yet in another embodiment, computer network system 100 can be a distributed computer system where different service modules of the SMIMS located in one or many different server computer 140 which is configured to provide services externally through remote invoking collaborative work such as distributed applications and services, layering and segmenting applications and services. The distributed computer system can not only improve concurrent accessability, but also reduce database connection and resource consumption. It also enables different applications of the SMIMS to reuse common services, making the functions of the SMIMS easy to extend to throughout computer network system 100.

Memory 170 may include Random Access Memory (RAM), Read-Only Memory (ROM), and/or other types of memory. Memory 170 illustrates an example of computer-readable storage media for storage of information such as computer-readable instructions, data structures, program modules or other data. Memory 170 stores a basic input/output system (BIOS) 172 for controlling low-level operation of server computer 140. Memory 170 also stores an operating system 171 for controlling the operation of server computer 140. It will be appreciated that operating system 171 may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 170 may further include one or more data storage 180, which can be utilized by server computer 140 to store, among other things, a digitized 3D/360° still map in a first storage referred to as a map storage 181 and real-time properties data of objects located inside 3D/360° still map in a second storage referred to as a property data storage 182. Real-time properties data and/or different types of data and commands stored in memory 170 may then be provided to other devices such as group of client computers 121-1, 121-2, . . . , 121-N, at least one client mobile devices 152, at least one cameras 131, at least one lighting devices 132, at least one video recording devices 133, and at least one sensors 134 based on a variety of events including a request, commands, instructions, automatic set-up, or the like. It is noted that throughout the present specification, the digitized 3D/360° still map stored in map storage 181 is referred to as a 3D/360° still map 181-1.

A 3D/360° real-time full information smart management integrated mapping (SMIM) module 190 may include computer executable instructions which, when executed by server computer 140, transmit, receive, and/or otherwise process messages (e.g., SMS, Multimedia Messaging Service (MMS), Instant Message (IM), email, and/or other messages), audio, video, and enable telecommunication with clients, e.g. group of client computers 121-1, 121-2, . . . , 121-N, at least one client mobile devices 152. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. SMIM module 190 includes a data retriever module 191, data converter module 192, data embedder module 193, device controller module 194, a 3D/360° interactive map manager module 195, and a data analytics and display module 196 enabled to perform actions further described below in conjunction with FIGS. 2-12. In at least one of the various embodiments, while they may be illustrated here as separate modules, data retriever module 191, data converter module 192, data embedder module 193, device controller module 194, 3D/360° interactive map manager module 195, and data analytics and display module 196 may be implemented as the same module and/or components of the same application. Further, in at least one of the various embodiments, data retriever module 191, data converter module 192, data embedder module 193, device controller module 194, 3D/360° interactive map manager module 195, and data analytics and display module 196 may be implemented as operating system extensions, modules, plugins, applications, or the like. In at least one of the various embodiments, data retriever module 191, data converter module 192, data embedder module 193, device controller module 194, 3D/360° interactive map manager module 195, and data analytics and display module 196 may be implemented as hardware devices such as application specific integrated circuit (ASIC), combinatorial logic circuits, field programmable gate array (FPGA), software applications, and/or the combination thereof.

Referring again to FIG. 1, data retriever module 191 is configured to obtain a final 3D/360° still image of a geographical area, retrieve data from various data sources including key-in data, data from clients' existing databases located in group of client computers 121-1, 121-2, . . . , 121-N, at least one client mobile devices 152 and at least one cameras 131, at least one lighting devices 132, property data from at least one video recording devices 133, and at least one sensors 134. Data converter module 192 is configured to convert different property data formats from group of client computers 121-1, 121-2, . . . , 121-N, at least one client mobile devices 152, real-time data from at least one cameras 131, at least one lighting devices 132, property data from at least one video recording devices 133, and at least one sensors 134 into a format used and accepted by server computer 140. In addition, data converter module 192 can convert different image data from different 3D scanners, drones, UAV, digital cameras into a common image format. This is because 3D scanners from different manufacturers such as FARO, Leica, Minolta, Trimble, Z+F all have different image formats that need to be reconciled.

Continuing with FIG. 1, data embedder module 193 uses all the data of the same formats including property data from different data sources listed above, image data and embed them into proper objects of the 3D/360° still image. After the data embedding task is completed, device controller module 194 establishes connections between users to at least one cameras 131, at least one lighting devices 132, property data from at least one video recording devices 133, and at least one sensors 134 via either IoT, supervisory control and data acquisition (SCADA), or programmable logic controller (PLC). Real-time imaging data such as videos, pictures, signals from different locations where at least one cameras 131, at least one lighting devices 132, property data from at least one video recording devices 133, and at least one sensors 134 are stationed within the geographical area can be instantaneously obtained and analyzed.

Continuing with FIG. 1 again, 3D/360° interactive map manager module 195 allows users to enter various key functions to obtain real-time information from the 3D/360° map and the real-time property information of objects located within the geographical area. In various aspects of the present invention, key functions include, but not limited to, virtually visit the geographical area without visiting the site; measure the physical dimensions of any objects located therewithin; view properties/descriptions of objects in the geographical area; retrieve any equipment/assets properties from the integrated database; observe real-time images and surveillance from at least one cameras 131, at least one lighting devices 132, property data from at least one video recording devices 133, and at least one sensors 134; remotely control (i.e., turning on/off and changing parameters, etc.) devices/equipments within the geographical area; perform computer vision analysis from at least one cameras 131, at least one lighting devices 132, property data from at least one video recording devices 133, and at least one sensors 134 for security purposes such as fire detection, motion detection, entry/exit detection, objects changing and counting detection; track real-time location of personnels and/or equipments within the geographical area; and set up users rights classification for accessibility and portfolio management.

Still referring to FIG. 1, data analytics and display module 196 performs analytics of all information obtained from 3D/360° interactive map manager module 195 and displays the results on the user's display screen or at least one client mobile devices 152.

Continuing with FIG. 1, in an exemplary implementation of the present invention, at least one cameras 131, at least one lighting devices 132, at least one video recording devices 133, and at least one sensors 134 are network-based devices such as the Internet of Things (IoT). That is, they can operate, control, and share data via network 110. It is noted that, non-limiting examples of network 110 include the internet, cloud computing, Software as a service (SaaS), Platform as a service (PaaS), Infrastructure as a service (IaaS), or permanent storage such as optical memory (CD, DVD, HD-DVD, Blue-Ray Discs), semiconductor memory (e.g., RAM, EPROM, EEPROM), and/or magnetic memory (hard-disk drive, floppy-disk drive, tape drive, MRAM) among others.

Continuing with FIG. 1, it will be appreciated that communication channel 161 may include, but not limited to, short range wireless communication channels, mid range wireless communication channels, and long range wireless communication channels. Wireless short range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies. It will be further appreciated that group of client computers 121-1, 121-2, . . . , 121-N, at least one client mobile devices 152 and at least one cameras 131, at least one lighting devices 132, property data from at least one video recording devices 133, and at least one sensors 134 can be connected together in a master-slave configuration.

Within the scope of the present invention, an object means buildings, rivers, streams, plants, parks, towers, etc. any feature located within the geographical area to be mapped. Real-time properties include the most updated description of an object including category of the object (building, stream, light post, garden, wall, bridge, etc.), when it is built, its area, numbers of stories, its status, its ownership, its current temperature, etc. Real-time properties as described above can be, but not limited to, in form of video streams, photo images, text description, operational parameters, and graphs/charts.

Figure 2:
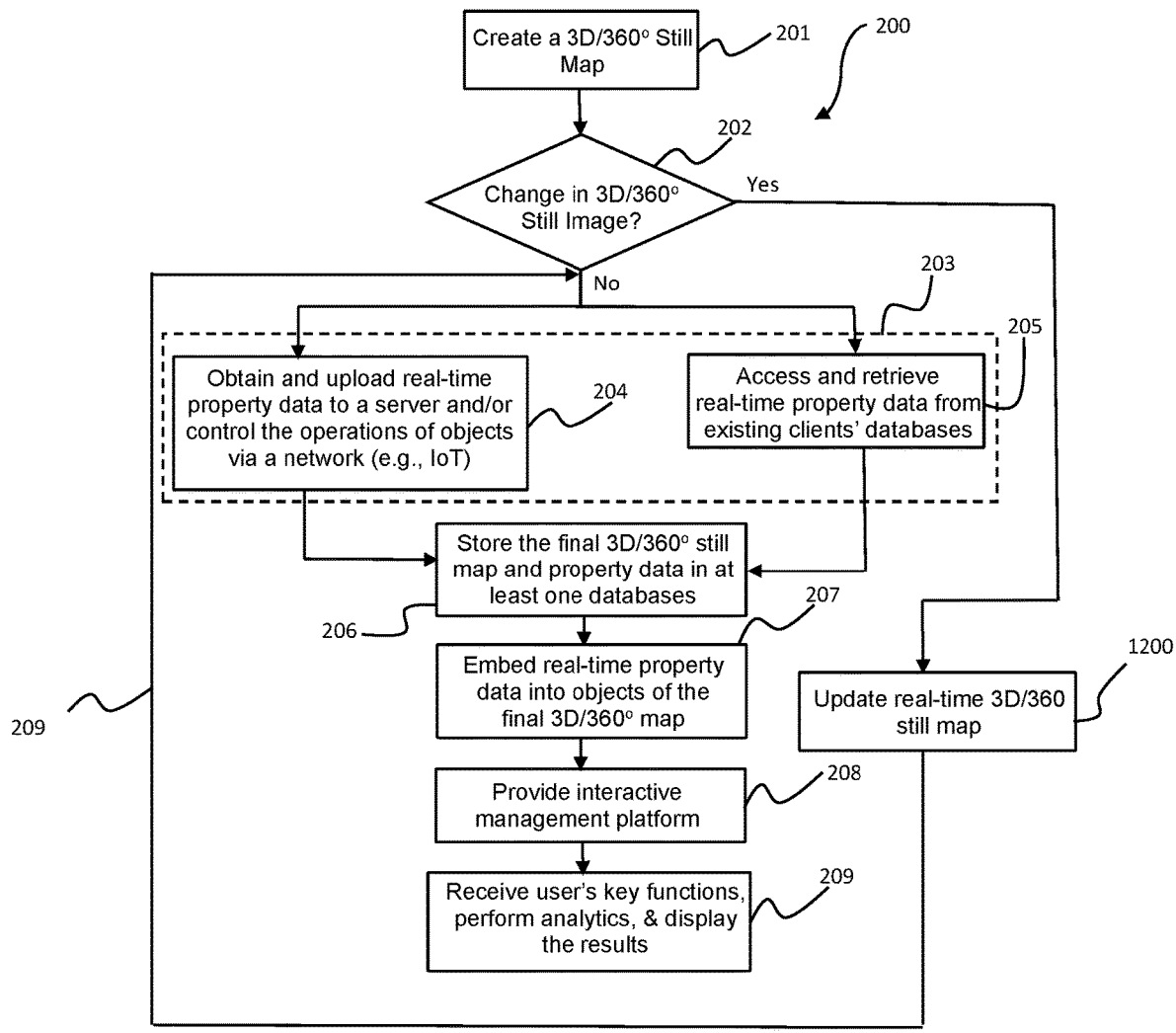
FIG. 2 is a flowchart illustrating a process of generating a real-time three-dimensional/360° smart management integrated mapping system (SMIMS) capable of providing a 3D/360° map, obtaining and displaying real-time full information of objects located therein, and controlling network-based devices found within such map in accordance with an exemplary embodiment of the present invention.

Now referring to FIG. 2, a flowchart 200 illustrating a process of generating and managing a real-time 3D/360° map having the capability of performing key management functions and displaying real-time full information (also known as Smart Management Integrated Mapping System 'SMIMS') in accordance with an exemplary embodiment of the present invention is illustrated.

At step 201, a 3D/360° still map of a geographical area and attributes (also known as properties) of each object located in the 3D/360° are generated and combined. Implementations of step 201 may include the following steps: a 3D/360° still map is generated by at least one 3D laser scanners which are high-definition surveying (HDS) and high-accuracy mapping or reality capturing. Each 3D laser scanner can capture rich details of the entire scene of a surrounding area including buildings, trees, rivers, grass, towers, etc. like a camera taking a 360° photos with accurate positions of every pixel. As such, measurements of areas, distances, and volumes of each object can be readily obtained. The measurements of areas, distances, and volumes and forecasts of objects located within the 3D/360° map is known as data volumetric analysis. Step 201 is realized by (SMIM) module 190 that collects 3D/360° still map and store it in data storage 180 in server computer 140, in any data storage of a group of client computers 121-1, 121-2, . . . , 121-N, at least one client mobile devices 152, or in the combination thereof, which is a network attached storage (NAS). As alluded above, throughout the present specification, the complete 3D/360° still map of the geographical area stored in first data storage 181 is referred to as a digitized 3D/360° still map 181-1 (or simply 3D/360° still map 181-1) of the geographical area.

Next is step 202, 3D/360° still map 181-1 is determined if changes have occurred therewithin. More particularly, any new buildings are recently built or destroyed, any trees, shrubs, grassyards, at least one lighting devices 132, or any edges, boundaries, etc. have been erected. The detailed description of step 202 is deferred to FIG. 11 and FIG. 12.

At step 1200, if 3D/360° still map 181-1 has been changed, the process of updating and finalizing this map is performed as described in details later in FIG. 11 and FIG. 12.

At step 209, after 3D/360° still map 181-1 is updated and finalized, process 200 returns to the following steps.

At step 203, property data are retrieved from different data sources such as clients' existing databases 123, key-in information, or from network-based devices. In one exemplary embodiment of the present invention, network-based devices include, but not limited to, at least one cameras 131, at least one lighting devices 132, and at least one video recording devices 133, at least one sensors 134, which can be IoT-based. Client's existing databases 123 can located in any computer among group of client computers 121-1, 121-2, . . . , 121-N, server computer 140, or combination thereof which forms a network attached storage (NAS). In some exemplary embodiments, clients' existing databases 123 can be separate databases that clients use to store the properties of their objects. Step 203 is implemented by data retriever module 191 discussed above in FIG. 1. As such, step 203 further includes step 204 and step 205. Step 204 relates to setting up continuous communication to obtain property data and/or controlling the operations of network-based devices at least one cameras 131, at least one lighting devices 132, and at least one video recording devices 133, at least one sensors 134. Step 205 relates to accessing clients' databases and retrieving the property data.

At step 204, real-time properties are continuously received from network-based devices. Server computer 140 constantly communicates with network-based devices in order to: (1) receive property data in real-time and (2) control the operations, i.e., turning on/off, changing parameters such as intensities, rotation, sleep mode, etc. Network-based devices include, but not limited to, at least one lighting devices 132, and at least one video recording devices 133, at least one sensors 134. Step 204 is realized by device controller module 194. In many exemplary embodiments of the present invention, device controller module 194 establishes connections between users to at least one cameras 131, at least one lighting devices 132, property data from at least least one video recording devices 133, and at least one sensors 134 via either IoT, supervisory control and data acquisition (SCADA), or programmable logic controller (PLC). Real-time imaging data such as videos, pictures, signals from different locations where at least one cameras 131, at least one lighting devices 132, property data from at least one video recording devices 133, and at least one sensors 134 are stationed within the geographical area can be instantaneously obtained and analyzed.

At step 205, real-time properties of clients' devices and objects can also be obtained by accessing clients' databases. When building objects in a geographical area, clients enter the corresponding properties either manually, semi-automatically, and/or automatically. Manual data entry is key-in information, i.e., property data is entered by hands. Semi-automatic data entry is partially key-in and partially done by the computers themselves since not all information area readily existed to be imported by the computers. Some information have to be keyed in manually. Automatic and semi-automatic data entry are accomplished from either clients' existing databases 123 of the group of client computers 121-1, 121-2, . . . , 121-N, different memory locations of permanent data storage 180, ROM/RAM/cache memory 144, or In many aspects, real-time properties of objects inside clients' databases are accessed, acquired, and saved by server computer 140 with 3D/360° SMIM module 190 of the present invention. More specifically, step 205 is realized by data retriever 191 of SMIM module 190 as described in FIG. 1.

At step 206, after real-time properties are obtained either by network-based devices or by accessing the clients' databases, real-time properties are stored in a permanent storage in a server such as data storage 180 of server computer 140. In one non-limiting implementation of step 206, real-time property data is saved in at least one databases or a network attached storage (NAS). Step 206 is realized by data retriever module 191.

Next, at step 207, real-time properties are embedded into the appropriate objects. As a non-limiting example of this step, properties of a particular building are embedded into that same building so that a client can acquire necessary knowledge about that particular building. In one implementation, real-time properties are embedded to an observation attached to a particular object, to any pixel of the object itself, or to a point-cloud of that object. Please refer to FIG. 10 for further illustration. Step 207 is realized by data embedder module 193.

At step 208, a 3D/360° interactive manager interface (platform, module, engine, etc.) is provided so that users can enter key management functions to acquire information regarding the geographical area. Key management functions include, but not-limited to, displaying properties of each object, controlling network-based devices, performing volumetric and analytic functions, etc. Step 208 is implemented by 3D/360° interactive manager module 195.

Finally, at step 209, real-time properties are rendered and displayed to each inquiring clients. Please refer to FIG. 11 and its descriptions for illustration of step 209. Step 209 is realized by data converter and display application 194.

In summary the following objectives of the present invention are achieved by process 200 of the present invention:

a 3D/360° real-time full information smart management integrated mapping system (SMIMS) that has the capability of generating a real-time 3D/360° map with real-time information associated with each feature inside the real-time 3D/360° map;

a 3D/360° real-time full information smart management integrated mapping system (SMIMS) that has the capability of generating a real-time 3D/360° map with real-time information obtained from network-based devices or from the Internet of Things (IoT) devices;

a 3D/360° real-time full information smart management integrated mapping system (SMIMS) capable of connecting to various types of clients' databases including asset databases, operational databases, and system databases;

a 3D/360° real-time full information smart management integrated mapping system (SMIMS) capable of integrating with clients' programmable logic controllers (PLC) and a supervisory control and data acquisition (SCADA) software so that the 3D mapping and management system of the present invention can control and acquire data from the clients' sensors and devices such as lighting devices, cameras, actuators, 3D laser scanners, etc. via web-based interfaces;

a 3D/360° real-time full information smart management integrated mapping system (SMIMS) capable of having the flexibility in package installation and operation so that the 3D/360° mapping and management system of the present invention can be hosted and ran on the clients' servers;

a 3D/360° real-time full information smart management integrated mapping system (SMIMS) capable of integrating with blockchains and artificial intelligence;

a 3D/360° real-time full information smart management integrated mapping system (SMIMS) that allows clients and developers to create 3D enterprise resource planning (ERP) platform and smart management;

a 3D/360° real-time full information smart management integrated mapping system (SMIMS) capable of setting up users' right classifications and portfolio management;

a 3D/360° real-time full information smart management integrated mapping system (SMIMS) capable of applying artificial intelligence (AI) engine such as computer vision, machine learning (ML), deep learning to perform auto-detection from real-time cameras and/or other imaging devices for security, fire detection, motion detection, and/or other useful purposes such as High Definition Survey (HDS), reality capture, volumetric surveys, facility management, marketing and proposals, forensics and security planning, education and entertainment, civil infrastructure, industrial applications, and heritage archeology;

a 3D/360° real-time full information smart management integrated mapping system (SMIMS) capable of tracking real-time location/movement of people and/or machines, equipments, objects within the covered geographical area by accessing GPS and/or other sensing devices from a user's mobile devices;

a 3D/360° real-time full information smart management integrated mapping system (SMIMS) configured to use QR code to obtain easy navigation and augmented reality (AR); and 3D/360° real-time full information smart management integrated mapping system (SMIMS) capable of voice commanding for hand-free control.

Figure 3:
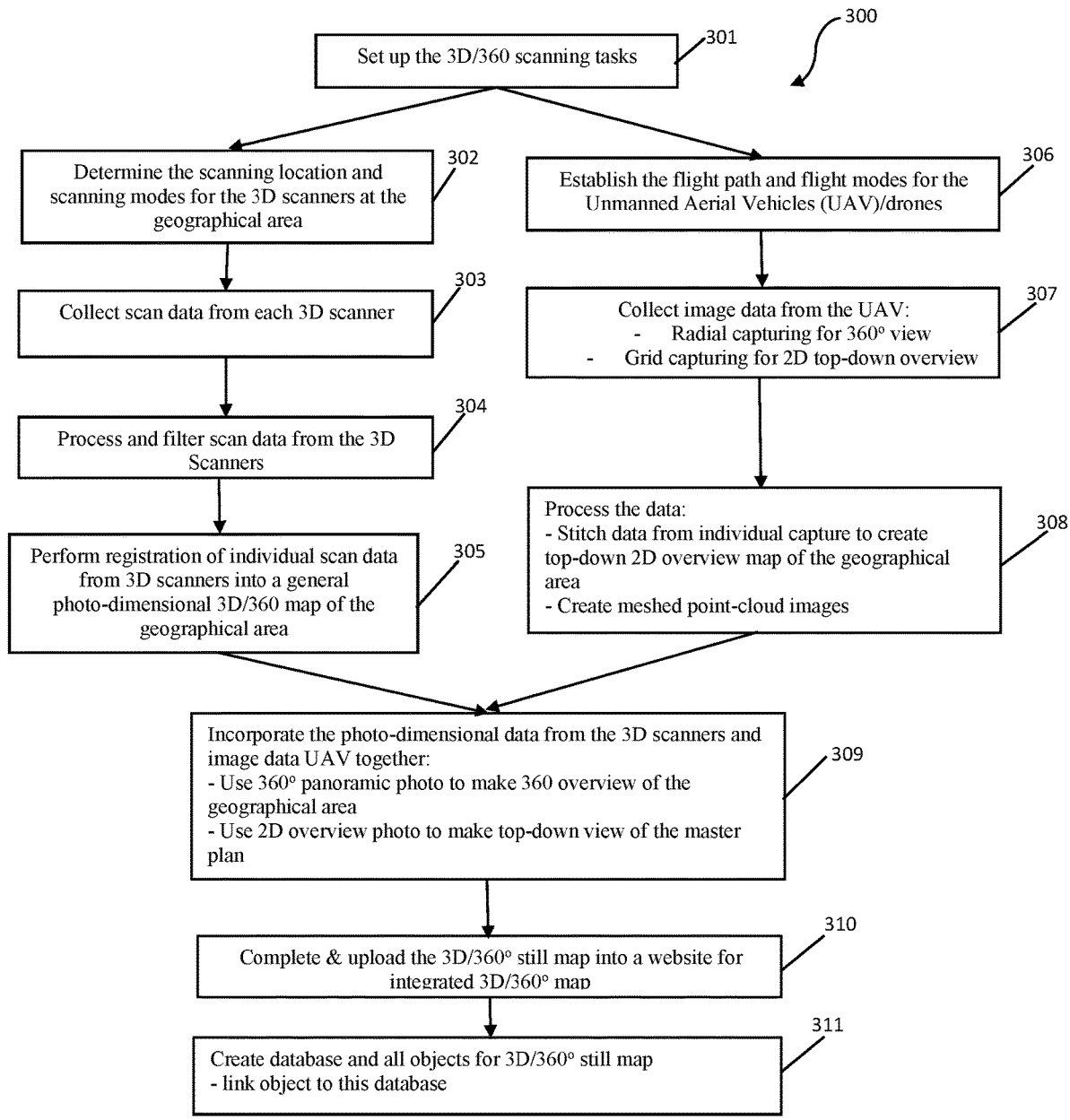
FIG. 3 is a flow chart illustrating a process of generating complete and integrated real-time 3D/360° still map of a geographical area and uploading it into an client-accessible network such as a webshare, a server, a cluster computing system, or a master-slave configuration in accordance with an embodiment of the present invention.

The detailed disclosures of process 200 are clarified in the following FIG. 3-FIG. 12:

Referring now to FIG. 3, a flow chart 300 illustrating a process of generating a 3D/360° still map of the geographical area and upload it into an client-accessible network such as a webshare, a server, or a master-slave configuration in accordance with an exemplary embodiment of the present invention is presented. In one aspect of the present invention, flow chart 300 is a more detailed description of step 201 above.

At step 301, at the beginning, a 3D/360° scanning tasks are set up. Depending on the geographical area (its topography, area, and complexity), the number of 3D laser scanners, flycams, drones, or unmanned arial vehicles (UAV), any flying aircrafts, and/or digital cameras or video recording devices are deployed. Afterward, the locations where they are strategically set up are chosen. In addition, the modes of operations of these devices are also considered so that an optimal 3D/360° still map is achieved.

At step 302, the number, modes, and locations of 3D laser scanners are determined so that the best images are achieved. Step 302 can be implemented using at least one 3D laser scanners.

At step 303, scan data from each 3D laser scanner are collected, scan data consisting of point-cloud data and image data. Each image data point has an (x,y,z) coordinate so that point-cloud of an object also include it own coordinates. As such, smaller objects can be stitched together to form a larger object.

At step 304, scan data from each 3D laser scanner are processed and filtered. More particularly, processes including noise removal, image smoothing, etc. are perform to improve the quality of the scan data obtained from each 3D laser scanner.

Next at step 305, images from all 3D laser scanners are registered and stitched together to create a complete 3D/360° map representative of the geographical area. As alluded above, the complete 3D/360° map consists of both image data and point-cloud data. Image data is the entire individual pixels that make up the panoramic image. A point-cloud is a collection of data points representing an object within the coordinate system of the 3D/360° map. Each data point in the panoramic image has an (x,y,z) coordinate so that a building, which is a point-clould, also has its own coordinates. As such, real-time properties can be attached to the correct building. Furthermore, sub-areas (e.g., a road strip) can be stitched to another sub-areas—because both are point-clouds. It will be appreciated that when a user hovers the cursor anywhere over an object (e.g., buildings, parks, etc.) the coordinates of that particular point where the cursor stops can be used as that object coordinates. As such, property of that object can be properly displayed without having to stop the cursor at a particular point (e.g., center of gravity) of that particular building. Registration is a process of aligning different scan images into a common reference system so that they can be stitched together to a complete 3D/360° still map of the geographical area.

In step 306, if flycams, drones, flying objects, UAVs, or any flying objects are used, the flight paths and operating modes of each flycams are set and carefully planned. Operating modes of flycams include altitude, velocity, and resolution of the cameras, scan rates, etc.

At step 307, data image from each flycams, drones, UAVs, and/or any flying objects are collected. In the implementation of step 307, UAV, drones, and flycams use photogrammetry and Lidar (Light Detection and Ranging) scanning to create data imagery including a radial capturing for 360° view and grid capturing for 2D top down overview. 3D radial capturing enables UAV scanners to capture 3D maps or models. Grid capturing creates a series of overlapping 2D images. In other aspects of the present invention, other types of UAV models can be used such as planemetric capturing for cadastral surveying, FLIR thermal maps, and normalized difference vegetation index (NDVI), etc.

At step 308, data image are processed and filtered and stitched together to form a meshed point-cloud. A photostitching process combines these 2D images into a single complete 2D image of the geographical area. Then a geometric correction process is performed (orthorectified) to give them uniform scales. This process removes all perspective distortion from the aerial photos, making the resulting mosaic of 2D images free of distortion. Similar stitching and filtering (orthorectification) steps are performed for the 3D models.

At step 309, point-clouds from 3D laser scanners and meshed point-clouds from flycams are stitched together to form a 3D/360° still map of the geographical area of interest. As alluded above, the final data image from the flycams include a 2D panoramic overview of the geographical area as well as the 360° overview of the geographical area from the air. As such, any missing details from the 3D laser scanners (e.g., edges, boundaries, minute objects, etc.) can be compensated by the final imagery from the flycams. In many embodiments of the present invention, the geographical area include, but not limited to, a city, an ancient citadel, a mall, an apartment complex, an industrial complex, a forest, etc. Clients can view every corner and every detail of the geographical area using the 3D/360° still map of the present invention. Small objects hidden behind a tall building such as a light post, a water faucet, an electrical meter can be captured and viewed. In addition, the 3D/360° still map of the present invention enables clients to see edges, boundaries, properties lines, infrared imagery, NDVI, FLIR thermal maps, etc. This feature of the present invention is impossible to achieve in the prior art 2D maps.

At step 310, a complete 3D/360° still map of the geographical area is achieved (hereinafter referred to as "3D/360° still map 181-1") and uploaded to a network accessible to clients. Clients only need to enter to an URL, http, or any website addresses to view the 3D/360° still map without having to load any software as in the case of Microsoft, ESRI, etc. In various embodiments of the present invention, 3D/360° still map 181-1 is stored in map storage 181 in data storage 180 and made accessible to clients by launching it to a network such as webshare, web-based, cloud-based, etc. so that clients can view 3D/360° still map 181-1 without having to install any other software applications. All of the above features are implemented and realized by data retriever module 191. In addition, as described later, the 3D/360° smart management integrated mapping system (SMIMS 190) of the present invention can also update in real-time any small changes in the geographical area such as a new faucet being installed behind an existing building. More detailed description of this feature of the present invention will be discussed later in FIG. 11 and FIG. 12.

Finally, at step 311, a data base and clients' links are created for the complete 3D/360° still map. As alluded above, in one exemplary implementation of step 311, the 3D/360° still map achieved from steps 301-310 is stored in map storage 181 of storage 180 to become digitized 3D/360° still map 181-1. Alternatively, in other embodiments and implementations, as a non-limiting example of step 311, the 3D/360° still map achieved from steps 301-310 can be stored in a geographical clients' databases, e.g., client databases located in different physical locations such as, but not limited to, a group of clients computer 121-1, 121-2, . . . , 121-N and clients' existing database 123. The clients' databases can be existing storages, i.e., property descriptions of objects are already existed therein. Clients' databases can be newly keyed-in information. The 3D/360° still map (not stored in map storage 181) can be saved in any of the above databases or the combination thereof, which forms a NAS (Network Attached Storage). Step 311 is realized by data retriever module 191 of SMIM module 190 described in FIG. 1 above.

Figure 4:
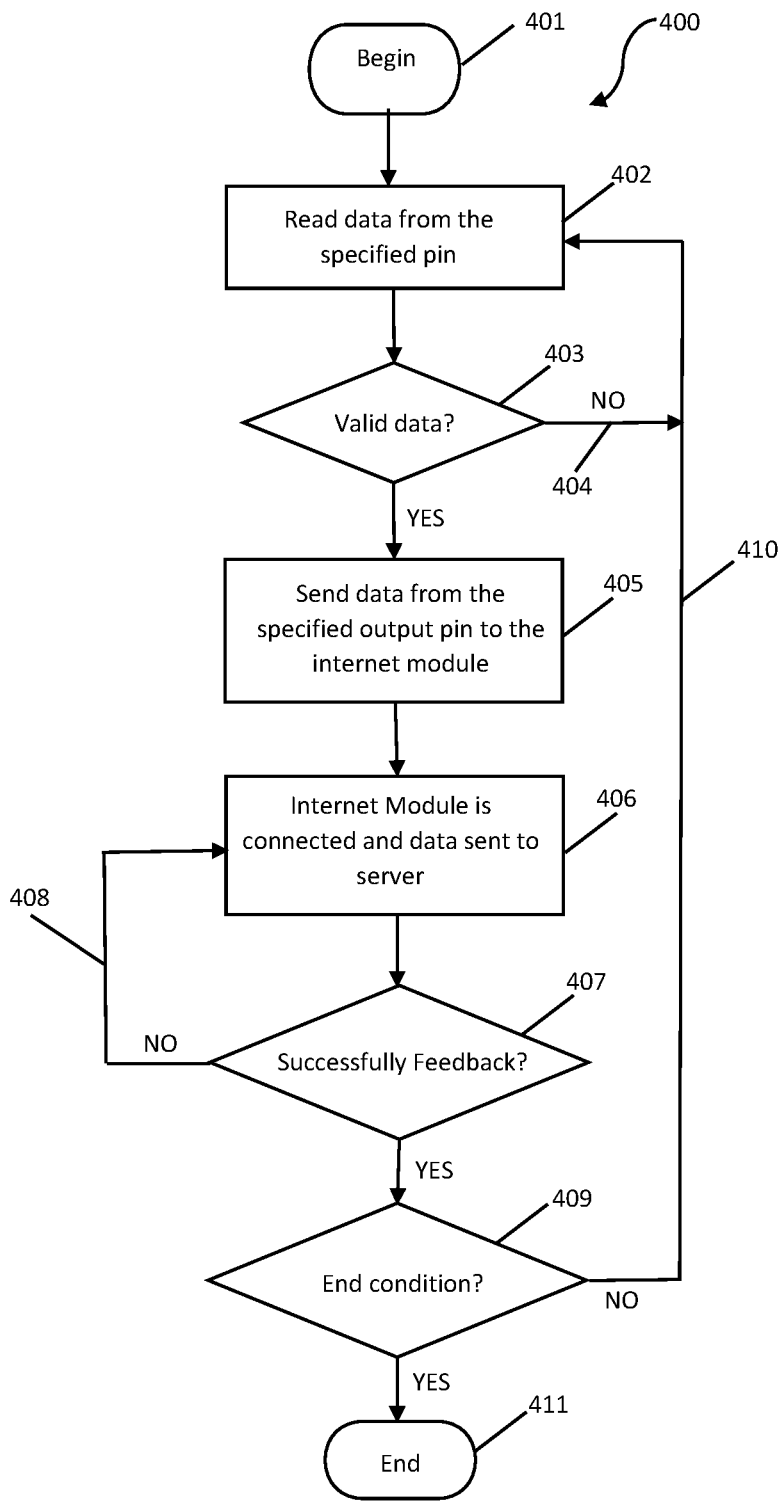
FIG. 4 is a flow chart illustrating a process obtaining real-time properties of objects from clients' databases or from network-based devices to a server computer having SIMMS capability in accordance with an exemplary embodiment of the present invention.

Now referring to FIG. 4, a flow chart 400 of a process of generating real-time properties of objects from clients' databases and/or from network-based devices in accordance with an embodiment of the present invention is illustrated. It will be appreciated that property data can be read from either network-based devices 131-134, from group of client computer 121-1, 121-2, . . . , 121-N, or from at least one mobile devices 152. This is due to the internet of things (IoT) and cloud-based network, any device can control any other devices and all devices have description properties.

First, at step 401, the process begins. One of the implementations of step 401 is achieved by connecting and/or powering up or initializing server computer 140 and smart management integrated mapping system (SMIMS) 190 described in details in FIG. 1 above. In the network-based device embodiment of the present invention, step 401 is implemented by connecting a programmable logic controller (PLC) and installing supervisory control and data acquisition (SCADA) software, or any wireless communication devices into network-based devices such as at least one lighting devices 132, and at least one video recording devices 133, at least one sensors 134. In another exemplary embodiment of the present invention, step 401 can also be implemented by connecting IoT-based devices. More specifically, at least one cameras 131, at least one lighting devices 132, and at least one video recording devices 133, at least one sensors 134 are IoT devices. Alternatively, property data can be streamed by real-time streaming protocol (RTSP) and any other streaming protocols. As alluded above, in various embodiments of the present invention, network-based devices 131-134, clients' existing database 123, respective group of client computers 121-1, 121-2, . . . , 121-N, at least one client mobile devices 152 are connected together via network 110 in a master-slave or cluster configuration into a single logical unit so that real-time properties of any device can be accessed from any devices within computer network system 100.

At step 402, property data from a specified pin of a wireless controller of a device are read. In practice, property data from IoT devices such as at least one cameras 131, at least one lighting devices 132, and at least one video recording device 133, and at least one sensors 134 are input into the input pins of a wireless controller such as PLC (not shown), real-time streaming protocol (RTSP), microprocessor, microcontroller, transceiver, or any other wireless communication devices. In case IoT devices are used, property data are continuously read into server computer 140 and managed by data retriever module 191. In group of client computers 121-1, 121-2, . . . , 121-N and at least one client mobile devices 152, network interface 143 is connected to property data storage 182 where property data is stored. When step 402 is performed, an output pin of network interface 143 sends out property data.

Next, at step 403, the property data are checked if the correct data format are received. Correct property data format including addresses and structure is specified by either the clients or the host, i.e., server computer 140. In addition, the correct addresses and geographic coordinates of a particular network-based devices 131-134 can also be checked to ensure the correct property data from the correct device are sent.

At step 404, if the data format is incorrect, the property data are rejected and incoming property data are continued to be read as described in step 402. Otherwise, the process 400 continues to the next step.

Next, at step 405, the property data with correct data format are sent from output pins of the wireless communication devices such as PLC, microprocessor, or microcontroller to a transmitting module. In an exemplary implementation of step 405, transmitting module includes a gateway module, an internet module, a RF transmitter, RF transceivers, or network interface 143, etc.

Next at step 406, property data are sent to a server by a transmitting module specified in step 405. In practice, step 406 is realized by transmitting modules, server computer 140 and data storage 180.

At step 407, determining whether the property data are successfully sent to a server. Data retriever module 191 sends a feedback command to the transmitting device to inform that the transmission is complete.

At step 408, if the transmission of property data does not successfully go through then it is transmitted again. If the transmission is determined to be successful, go to the next step.

Next, at step 409, whether other queries from clients are received are checked. The implementation of step 409 is realized by data retriever application 191 of server computer 140.

At step 410, if other queries are received from group of clients computers 121-1, 121-2, . . . , 121-N, or at least one client mobile devices 152, then process 400 repeats from step 402.

Otherwise, at step 411, if no other queries are received, then process 400 ends. Process 400 is implemented by data retriever application 191. In various embodiments of the present invention, data retriever module 191 includes both hardware and software units such as PLC and SCADA.

Figure 5:
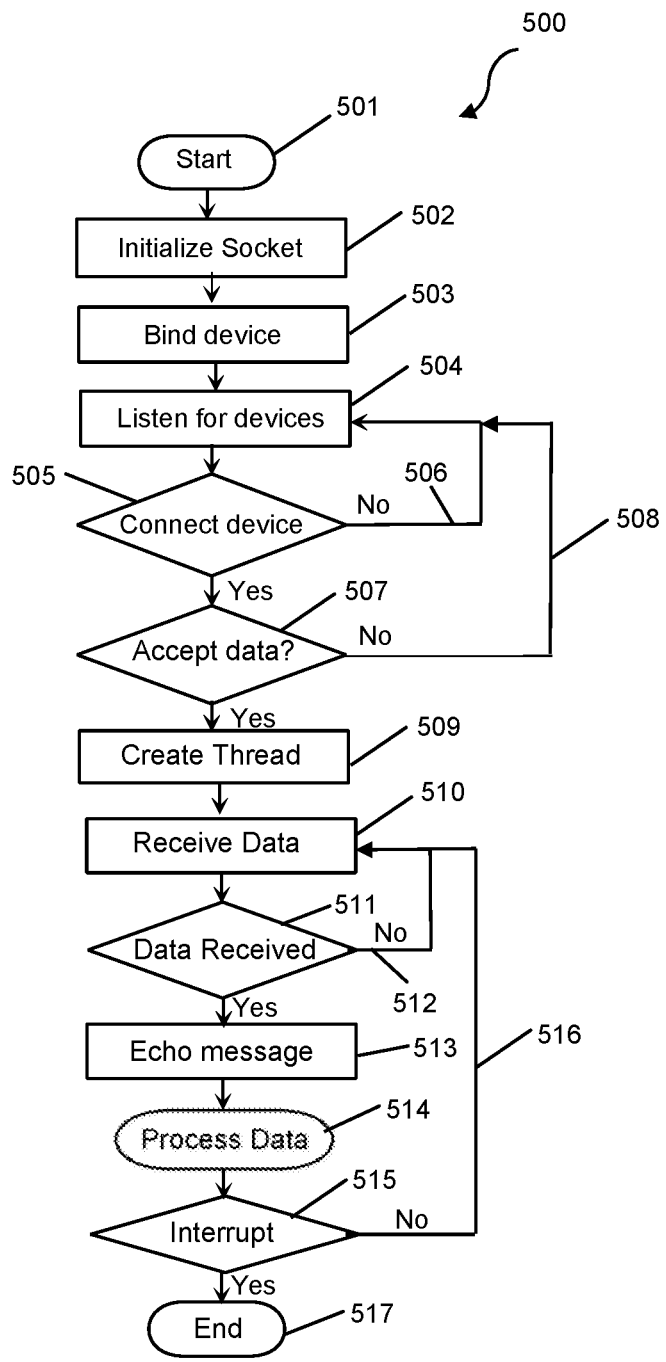
FIG. 5 is a flow chart illustrating a communication process between network-based devices and a server computer having SIMMS capability in accordance with an exemplary embodiment of the present invention.

In other aspect of the present invention, FIG. 5 illustrates a flow chart 500 of a communication process for listening, receiving, and storing real-time properties of objects between network-based devices and a server in accordance with an exemplary embodiment of the present invention.

At step 501, the process starts by turning on (power on) and/or communication initialization between network-based devices 131-134, clients' existing databases 123, group of client computers 121-1, 121-2, . . . , 121-N, at least one client mobile devices 152, connecting to server computer 140.

At step 502, the socket between network-based devices and server is initialized. In one exemplary embodiment of the present invention, the IP address and port number of network-based device 131-134 and those of server computer 140 are prepared for two-way communication between them. In addition, network-based devices such or IoT-based devices such as at least one cameras 131, at least one lighting devices 132, and at least one video recording device 133, and at least one sensors 134 are also initialized for continuously sending/receiving property data to server computer 140. In one exemplary implementation of step 402, TCP/IP protocol, http/https, or real-time streaming protocol (RTSP) protocol can be also used.

At step 503, when the two-way communication between network-based devices and server has been established, at least one cameras 131, at least one lighting devices 132, and at least one video recording device 133, and at least one sensors 134 are said to be binding or ready for property data transfer.

At step 504, once the communication is ready, server computer 140 starts to listen for connections from network-based devices such as at least one cameras 131, at least one lighting devices 132, and at least one video recording device 133, and at least one sensors 134.

At step 505, whether a network-based device connects to the network server is determined.

At step 506, if no network-based devices want to connect then the network server continues to listen. If any network-based devices wants to connect, process 500 causes the server to move to the next step.

At step 507, whether the network server accepts the request sent to the correct socket is determined.

Next, at step 508, if the request is rejected then the server continues to listen at step 504. The request is rejected because the socket address is not correct or for other software or physical problems such as ESD, power down, and/or other electrical abnormalities.

At step 509, if the request is correct, a thread is created. A thread is a light weight process which is a basic unit of CPU execution prepared to execute queries from network-based devices such as IoT devices. A thread consists of a program counter, a thread ID, a stack, and registers. As such, data retriever module 191 includes hardware components such as program counter, a clock, and registers. In one exemplary implementation of step 509, multi-threads can be created so that multi queries from the same or different network-based or IoT devices can be accomplished.

At step 510, if queries are successfully executed, determine whether data is received. In the present invention, data include real-time properties (attributes or description) from different objects in 3D/360° map.

At step 511, determine whether data are partially received, completely received, or not received at all.

At step 512, if data are not received at all, partially, or completely received, continue to receive data at step 510.

At step 513, if data receipt is complete, then network server computer sends an echo to inform the network-based devices the transmission of property data is complete.

At step 514, data processing begins. The detailed process of data processing will be described in FIG. 6.

At step 515, during the data processing step, the network server computer continues to find whether an interrupt occurs. Generally, there are three types of interrupts: internal interrupt (i.e., when client attempts to do higher priority task such as moving the mouse), software interrupt (i.e., errors in the instructions or queries), and external interrupt (i.e., virus attack or power off).

At step 516, if there is no interrupt, then continues to receive data.

At step 517, if interrupts occur then the process ends and the real-time properties are recorded onto at least one data storages such as data storage 180 or any combination of data storages that form a NAS.

Figure 6:
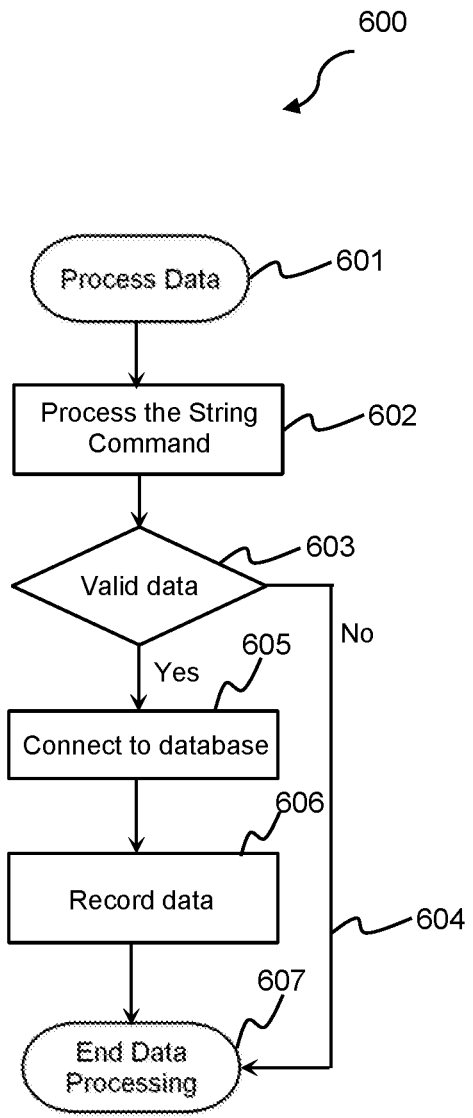
FIG. 6 is a flowchart illustrating a process of checking and storing data into a permanent storage by a server computer having SIMMS capability in accordance with an exemplary embodiment of the present invention.

Now referring to FIG. 6, a flow chart 600 of a process of storing data into a permanent storage by a network server computer in accordance with an exemplary embodiment of the present invention is illustrated.

At step 601, data processing begins. That is, after the two-way communication between a server and clients has established and data are completely received as described in FIG. 5, the data processing begins. It will be appreciated that any computer in group of client computers 121-1, 121-2, . . . , 121-N can be set up as a network server computer described by server computer 140 in FIG. 1.

At step 602, string processing is processed. That is, the data received are in large, aggregate discrete units called frame. Commonly, a frame text contains addresses, payload or content of the data, and error control or error correction, etc. Property data of the present invention includes many frames which contains description text of an object, photo images, video streams, etc. Step 602 is realized by data retriever module 191. As alluded above, in many embodiments of the present invention, data retriever module 191 may include, but not limited to, hardware and software components such as PLC, SCADA, registers, clocks, counters, memory, wireless transreceivers, I/O unit, network interfaces and software instructions to perform steps from methods 400-600.

At steps 603, the correct frame text of each frame of data is validated. If it is correct, then data are connected to property data storage 182.

Next at step 605, the received data with correct frame text are recorded into property data storage 182.

At step 606, if the frame text is not correct, data processing ends in next step.

At step 607, if the recording of data is complete and/or the frame text is not correct, data processing 600 ends here.

Figure 7:
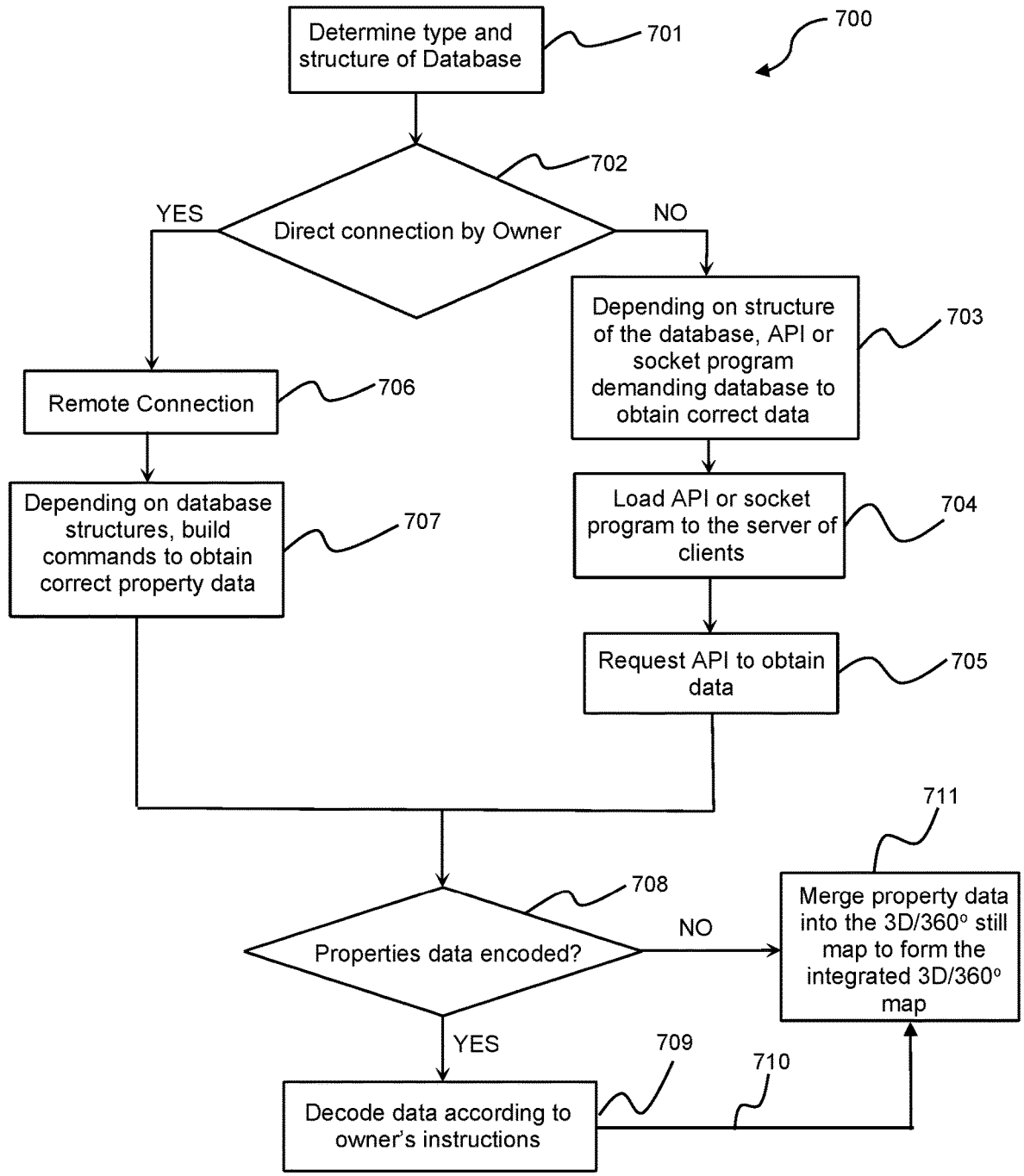
FIG. 7 is a flowchart illustrating a process of accessing and acquiring data from existing clients' databases in accordance with an exemplary embodiment of the present invention.

Next refer to FIG. 7, a flow chart 700 representing a process of accessing and acquiring data from clients' existing databases 123 in according with an exemplary embodiment is illustrated.

At step 701, the structures of client's existing databases are determined. The structures of databases depends on how the designers initially partitioned them. For example, the names of the tables, the fields, the manners the tables are linked to one another, etc. In step 701, the structures of clients' existing databases are ascertained.

At step 702, direct accesses to clients' databases are determined. There are three scenarios: (1) clients allow complete accesses to their databases, i.e., clients hand over their databases to the network server computer or any host or master computer; (2) clients only allow direct remote accesses to their databases; and (3) clients do not allow direct accesses to their databases, i.e., clients only allow remote indirect access to property data only.

Next at step 703, in case the clients do not allow direct remote accesses to their databases, i.e., clients only allow indirect remote accesses. Depending on the structures, properties data are demanded. In an exemplary embodiment of the present invention, a socket program or an API program is designed to handshake with clients' databases, search for property data, and retrieve them. Step 703 is realized by data retriever module 191.

At step 704, the socket program or API program is installed in the clients' servers. In one exemplary embodiment of the present invention, socket program or API program is a special application program that enables machine-to-machine communication and operation interface similar to a graphics user interface (GUI) for humans. When the socket or API program is installed, it functions as a GUI on the clients' server for server computer 140 of the present invention to operate upon.

At step 705, after the socket program or API program has been resided in the clients' servers, it is designed to search and request to retrieve property data. Server computer 140 activates the socket or API program to retrieve property data from the clients' servers.

Now at step 706, in case the clients allow direct remote access to their databases, remote connections are established. Remote connections are realized by communication channel 161 described above in FIG. 1.

At step 707, depending on the clients' data structures, the correct property data are requested. In one exemplary embodiment of the present invention, commands are written to go through each type of database to retrieve the correct property data. It is noted that in case the clients allow complete access to their databases, the retrievals of the property data are simple, similar to retrieving data from local hard drives.

Next, at step 708, the retrieved property data are determined whether they are encoded by each client. After the property data are successfully retrieved from different scenarios described above, they are checked if they are encoded. It is noted that encoding is the process of putting a sequence of characters (letters, numbers, punctuation, and certain symbols) into a specialized format for efficient transmission or storage. Decoding is the opposite process—the conversion of an encoded format back into the original sequence of characters. Encoding and decoding are used in data communications, networking, and storage.

At step 709, if property data are encoded, they are decoded using clients' decoding instructions or any other decoding algorithms. In many situations, data retriever module 191 can decode commonly encoded property data such as ASCII, Unicode, BinHex, Uuencode, and MIME, etc.

At step 710, after decoding, the decoded properties data are embedded into the 3D/360° still map as in the following step 711.

Finally at step 711, if the property data are not encoded, they are ready to be stored in data storage 180 and embedded in the 3D/360° still map (also known as the digitized 3D/360° map 181-1). In various embodiments of the present application, the property data can be retrieved and stored in a different data storage and the API of the present invention can still embed them with the 3D/360° still map stored anywhere in computer network system 100 to form the integrated 3D/360° map. It will be appreciated again, the 3D/360° still map is the combined and complete map of the geographical area taken by both 3D laser scanners and UAV, drones, flycams, or any flying means. The integrated 3D/360° map is the 3D/360° still map embedded with property data obtained by process 700 described above. The process of embedding property data into the 3D/360° still map further includes the steps of converting the acquired property data into displayable images and merging (embedding) these property displayable images into the 3D/360° still map so that clients can see both.

It will be appreciated that after process 700 described above has been performed by data retriever module 191, real-time property of objects located within the 3D/360° still map are ready for clients to view without further purchasing them in a CD-ROM, a data storage such as USB, or down loading updates from a pay-as-you-go service website in prior-art systems such as GPS, and ESRI.

Figure 8:
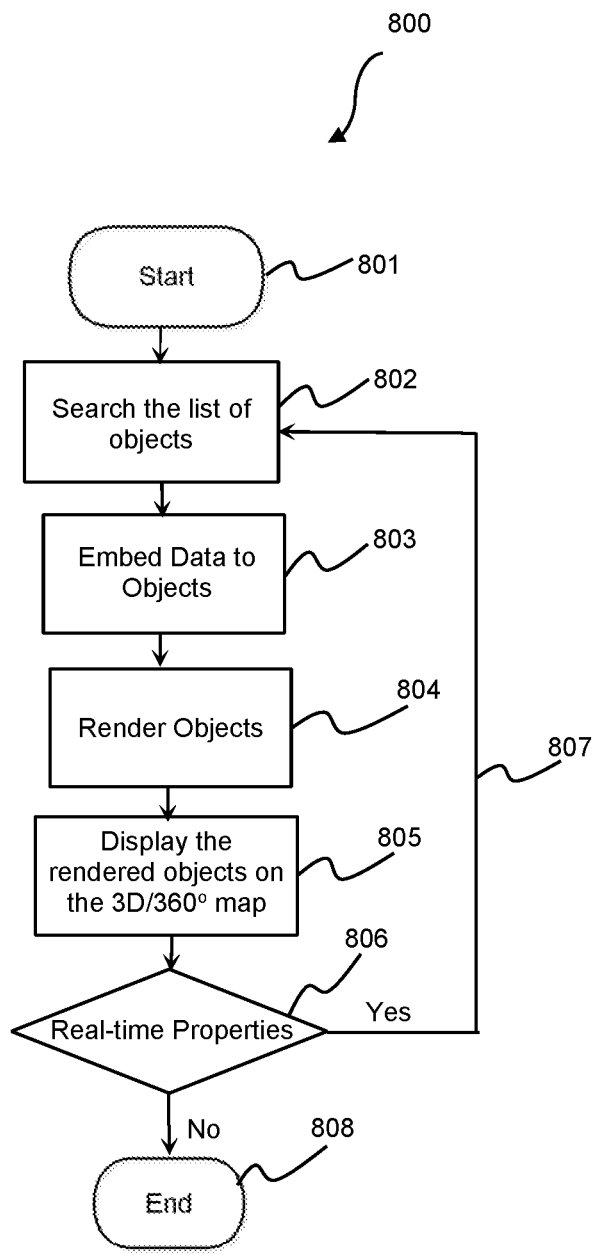
FIG. 8 is a flow chart illustrating a process of embedding and displaying real-time property data of an object onto the 3D/360° map in accordance with an exemplary embodiment of the present invention.

Now referring to FIG. 8, flow chart 800 of a process of displaying real-time properties of an object on the integrated 3D/360° map in accordance with an embodiment of the present invention is illustrated. In one exemplary embodiment, this process is implemented by data converter module 192 and data embeder module 193.

At step 801, the process of displaying the property data on a particular object of the integrated 3D/360° map starts. More particularly, after digitized 3D/360° still map of the geographical area and the properties of each object located therein are generated as described above, they are converted into displayable images and combined with the 3D/360° still map into the integrated 3D/360° map. It is noted again that the integrated 3D/360° map is 3D/360° still map 181-1 that is made ready to display the property data of a particular object. For recapitulation, the 3D/360° still map generated as described in FIG. 1 above which are high-definition surveying (HDS) and high-accuracy mapping or reality capturing. Measurements of areas, distances, and volumes of each object can be readily performed. Then, properties data of each object inside the 3D/360° still map are generated by data retriever module 191 of the present invention that collects the descriptions/properties data and enables the controlling of network-based devices as described in FIG. 2-FIG. 7 above. Finally, the integrated 3D/360° map is impregnated with all acquired properties from clients' databases and device controlling capability are stored in property data storage 182 in server computer 140. Afterward, step 801 begins.

Next is step 802, the list of objects is searched and property data are selected and retrieved from database or a set of databases (e.g., NAS as alluded above). In one exemplary implementation of the present invention, as a user queries about an object (i.e., user hovers the cursor or clicks on a location of an object), the exact universal unique user identification (UUID), the xyz coordinates, description, and status of the queried object and/or its identifier are registered. As a non-limiting example, at least one lighting devices 132 shall have the following search query: (UUID, xyz coordinate, LED01, state ON or OFF). Only proper properties including videos, images, description that matched with the exemplary described format are searched and selected from the database. In practice, step 802 is performed by the queries from user computers 121-1, 121-2, . . . , 121-N, at least one client mobile devices 152. The selection of the appropriate property is performed by algorithms of 3D/360° interactive manager module 195 which commands input/output interface 145 to send to the client. In various embodiments of the present invention, 3D/360° interactive manager module 195 may include voice commands, pop-up menus, drop-down menus, or by a simple curser activation by hovering or clicking the cursor on an object.

At step 803, property data are embedded into each object by either universal unique identifier (UUID) and/or coordinates so that the user can view the properties of the queried object. As an illustrating example of step 803, when the client selects the object such as at least lighting device 132, only properties associated with the selected lighting device 132 are displayed. Step 803 is realized by data retriever application 191 and 3D/360° interactive manager module 195.

At step 804, objects and properties, attached to the queried object, are rendered into displayable images in the integrated 3D/360° map. As alluded before, properties may include text description, videos, graphs/charts, 3D models, metadata and photo images. Provided videos and photo images are already displayable and need not to be converted. In accordance with an exemplary embodiment of the present invention, text description of a queried object is converted into displayable images with a specified format. A non-limiting example of the specified format may include a frame around a text description of at least one lighting devices 132. Furthermore, if at least one lighting devices 132 is ON, they will appear as bright yellow on the integrated 3D/360° map at the correct location. Step 804 is realized by data converter module 192.

At step 805, the object and properties are displayed at the correct coordinate position in the integrated 3D/360° map. Since each pixel of the 3D/360° map has an (x,y,z) coordinate generated by the 3D laser scanners, object and its corresponding properties can be displayed at the exact location. For example, when the client selects at least one lighting devices 132, properties from at least one lighting devices 132 are read and sent to server computer 140 via network 110. The properties from at least one lighting devices 132 are selected and converted into displayable images in a specified format. Finally, step 805 can be realized by data converter module 192, 3D/360° interactive manager module 195, and data analytics and display module 196 which displaying the text description such as "lighting device number, ID, location, current in mA, wattage in W, installation date, on/off state, maintenance history, etc." The attributes in form of text description is displayed at one of the client computer 121-1, 121-2, . . . , 121-N.

Continuing with step 805, in various embodiments of the present invention, 3D/360° interactive manager module 195 is configured to provide key management functions to clients such as drop-down menu, voice commands, pop-up, GUIs, cursor activation, etc. attached to the integrated 3D/360° map so that users can view the real-time properties, control network-based devices, and perform data analytics and surveying.

Next, at step 806, whether other queries different from real-time properties are received and checked. The implementation of step 806 is realized by microprocessor 141 of 3D/360° server computer 140. More particularly, step 806 is implemented by data display and analytics module 196.

At step 807, if other queries are different from real-time properties are received at group of client computers 121-1, 121-2, . . . , 121-N or at least one client mobile devices 152, then process 800 repeats at step 802.

Finally, at step 808, if no other real-time property queries are received, then process 800 ends.

Figure 9:
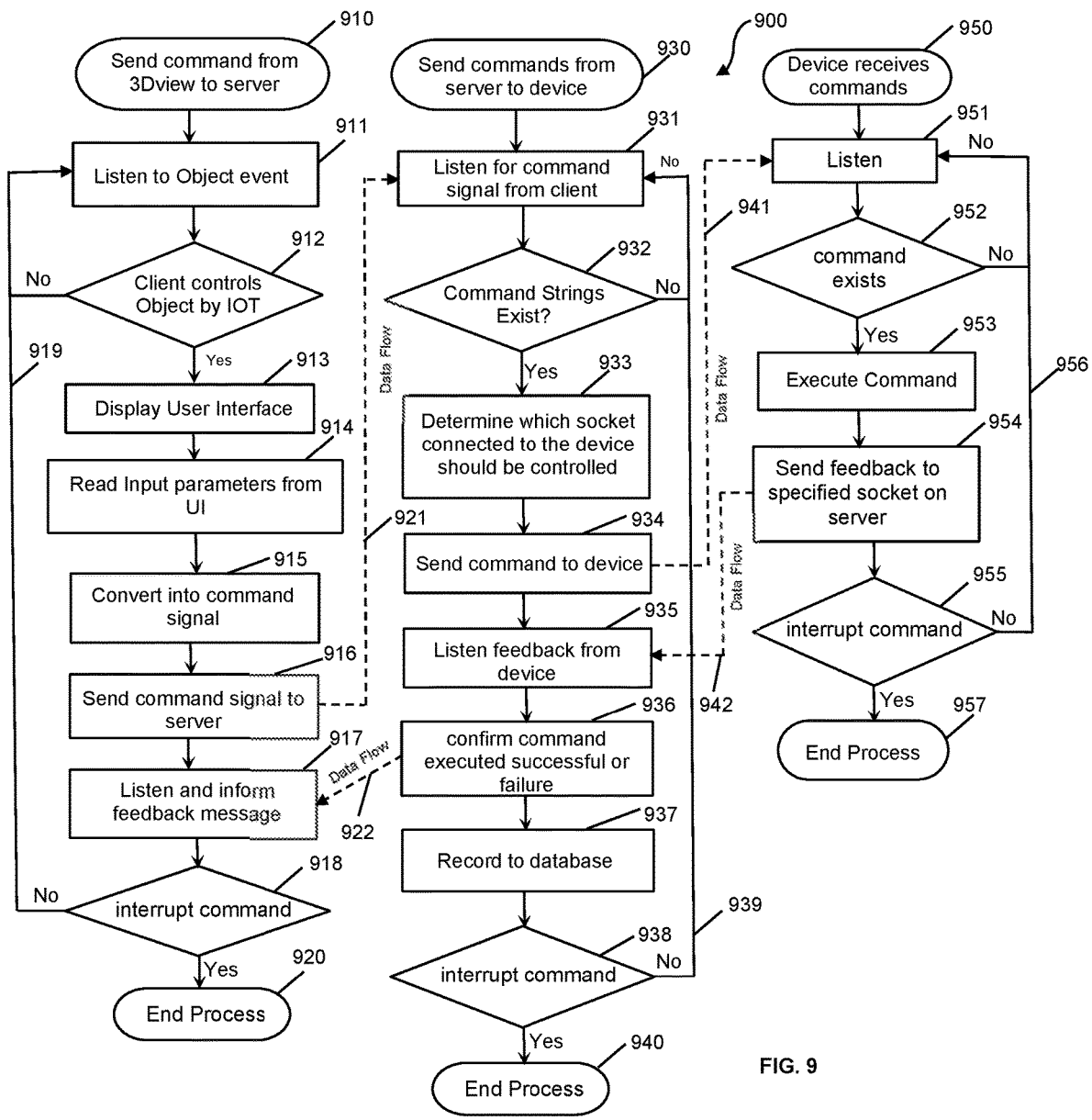
FIG. 9 is a flow chart illustrating a process of interactions between clients, server computer having the 3D/360° smart management integrated mapping system (SMIMS) capability, 3D/360° map, and network-based devices in accordance with an exemplary of the present invention.

Next, FIG. 9 illustrates a process 900 for remotely controlling of network-based devices and updating properties of objects within the geographical area in accordance with an exemplary embodiment of the present invention.

In another aspect of the present invention, FIG. 9 illustrates the continuous controlling and interactions between clients, server, and devices for acquiring/updating real-time property, controlling of network-based devices, receiving status feedback, using 3D/360° smart management integrated mapping system (SMIMS) 190 of the present invention.

Referring now to FIG. 9, in various embodiments of the present invention, flow chart 900 contains three stages: (1) in the first stage, a user sends a command from the displayed integrated 3D/360° map to a server via 3D/360° interactive manager module 195; (2) in the second stage, the server receives the command and forwards it to the device; and (3) in the third stage, the device receives and executes the command. The command can be an inquiry for real-time property and/or controlling the devices, i.e., turning the device on or off.

At step 910, a command from the integrated 3D/360° map is sent to a server. In a non-limiting example, the client can send a command by moving the cursor to a particular object (i.e., a sensor or a lighting device) in the integrated 3D/360° map, using a provided pop-up menu, activating an icon, a graphic user interface (GUI), or voice commands.

At step 911, object events are listened or observed. Non-limiting example of object events include on/off state of the object, current status of the object such as being built, being destroyed/removed, temperature, or video images being streaming, etc.

At step 912, object can be controlled by a user. In one exemplary embodiment of the present invention, an object can be controlled by the Internet of Things (IoT), or by other means such as PLC, SCADA, wireless controllers, or RTSP as described above.

At step 913, if an object is controlled by the user, a graphics user interface (GUI) and/or a voice command interface are displayed so that the client can turn on, turn off, dim, increase intensity, etc. of the object.

At step 914, the user's specific command is detected and/or interpreted. In other words, input parameters such as how much the client wants to increase the intensity, sensitivity, how much the client wants to rotate the device, etc. All are parameterized into the commands.

At step 915, input parameters from the user's command are interpreted and converted into instructions so that the device can understand and operate upon. This instruction is sent to device as part of data flow 921 at step 931 which will be discussed later on.

At step 916, after the command is sent, feedback from device is listened or detected. This is part of data flow 922 from device back to server.

At step 917, whether interrupt to stop the command is determined. In a non-limiting example, interrupts of step 917 can be intentional or unintentional. Intentional interrupt can be sent by the client. Unintentional interrupts can be caused by power down, electrical surges, and other software or hardware glitches.

If there is an interrupt, then process 910 ends.

Otherwise, at step 919, other object events from the client are continued to listen to. In case the client does not control the devices, other object events are also listened to.

Next referring to step 930, command is received by the server. Steps 930-940 describe in details the process by which 3D/360° smart management integrated mapping system (SMIMS) 100 of present invention controls the devices.

At step 931, the server computer are continuously listening to commands from the clients via network 110. Steps 930 and 931 are implemented by SMIMS module 190 of server computer 140.

At step 932, whether a command string is received is determined. The devices located within the integrated 3D/360° map determine whether a command is received.

At step 933, if a command is received, then determine which socket connected to the device is controlled. As a non-limiting example, the selection of specific socket determines which lighting device is selected and whether the command attempts to read property data only, input property data into the device, or control the device, etc.

At step 934, the command is sent to the particular device. This is part of data flow 941 to the device.

Next at step 935, after the server sends command to device, it listens to feedbacks to confirm whether the command has been successfully executed. If the command has successfully executed, this is part of data flow 942. Please refer to step 954 below.

At step 936, the execution of the command is confirmed as success or failure. A feedback signal is sent from the server to the clients in data path 922.

At step 937, the command or object event is recorded to the database to update the status of the device for future queries.

At step 938, whether an interrupt occurs is determined. At step 939, if there is no interrupt, the server continues to listen for other commands.

At step 940, if there is an interrupt, then the process 900 ends.

Next, referring to step 950, the command is executed at the device level. Steps 950-957 describe in details the process by which the device executes the command.

At step 951, the device is continuously listening for commands.

At step 952, determine whether a command exists (or sent to the device).

At step 953, if a command is received then the device executes the command.

At step 954, after the command has been executed by the device, it sends a feedback back to the server to report the status of execution. This is part of data flow 942, feedback signal is sent back to server.

At step 955, the occurrence of an interrupt is determined. At the device, the interrupt can be, but not limited to, power surge, ESD events, or any other external phenomena such as fires, etc.

At step 956, if an interrupt does not occur, then the device continue to listen for other commands.

At step 957, if an interrupt event occurs, then step 950 ends.

It will be noted that processes 200-900 can be performed by SMIMS module 190 in form of a computer software program stored in a non-transitory computer readable medium of server computer 140. In one exemplary embodiment of the present invention, computer readable medium includes program instructions that when executed by microprocessor 141 implement processes 200-900 for displaying real-time properties of an object and/or controlling of network-based devices in the integrated 3D/360° map by means of SMIMS module 190. The non-transitory computer readable medium 170 includes optical memory such as CD, DVD, HD-DVD, Blue-Ray Discs, etc.; semiconductor memory such as RAM, EPROM, EEPROM, etc.; and/or magnetic memory such as hard-disk drive, floppy-disk drive, tape drive, MRAM, etc. The computer software program also includes instructions that display a graphic user interface (GUI) on the display screens of group of client computers 121-1, 121-2, . . . , 121-N and at least one client mobile devices 152. When the GUI is activated by a client, 3D/360° map 181-1 is displayed and processes 200-900 are performed as described above.

The processes disclosed above achieved the following objectives in addition to the objectives cited above:

A high-definition and realistic 3D/360° map of complex geographical area or surrounding and environment is generated where each pixel has a precise (x,y,z) coordinate so that volumetric and measurements analytics can be performed.

Real-time properties of objects located inside the 3D/360° map can be viewed at any moment in time. Real-time properties include video streams, photo images, text description, graph/charts, animations, 3D models, etc. can be obtained by either drop-down menus, cursor-commands, or voice commands.

In one exemplary embodiment, all devices such as at least one cameras 131, at least one lighting devices 132, at least one video recording devices 133, and at least one sensors 134 are IoT devices. Therefore, they can be controlled and their properties can be obtained from any computer of group of client computer 121-1, 121-2, . . . , 121-N and at least one client mobile devices 152 by the disclosed operations of server computer 140. In summary, FIG. 2-FIG. 9 above disclose exemplary embodiments and features of processes 200-900 operable to cause system 100 to perform the operations of the present invention which will be illustrated by FIG. 10. FIG. 11-FIG. 12 illustrate another exemplary embodiment of the present invention that produce both real-time 3D/360° map and real-time properties of objects located therein.

Figure 10:
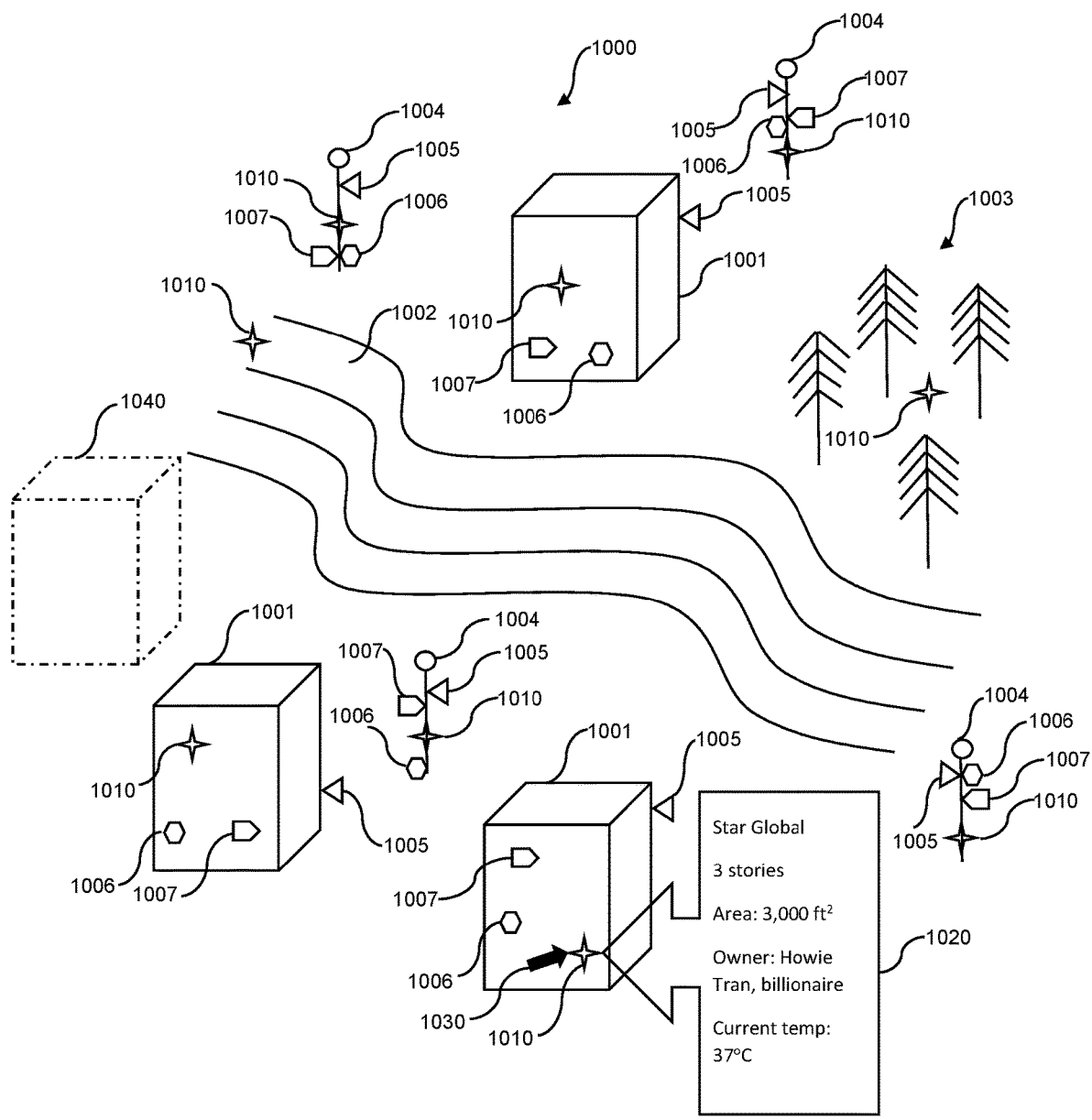
FIG. 10 is an exemplary display of a geographical area generated by the 3D/360° smart management integrated and mapping system (SMIMS) in accordance with an exemplary embodiment of the present invention.

Now referring to FIG. 10, a perspective view of a display screen of three-dimensional/360 degree map 1000 having the capability of displaying real-time full information in accordance with an exemplary embodiment of the present invention is illustrated. Integrated 3D/360° map 1000 includes buildings 1001, a stream 1002, a park 1003, at least one lighting devices 1004, at least one cameras 1005, at least one sensors 1006, at least one video recording devices 1007. Please note that map 1000 presented by FIG. 10 is the integrated 3D/360° map because it has been readied with the displaying of real-time properties displaying, controlling of network-based devices, and providing data analytics as described in details in FIG. 2-FIG. 9 above. In one exemplary embodiment, many observation points 1010 are positioned ubiquitously on 3D/360° map 1000 so that when a user moves a cursor 1030 to one of observation points 1010, properties of a particular object such as building 1001 is displayed. In this particular non-limiting example shows in FIG. 10, cursor 1030 is pointed or hovers above to observation point 1010 of the "Star Global building, it has 3 stories, each story has a surface area of 3,000 ft$^2$, and the owner is Howie Tran, the real-time current temperature is 37° C." In addition, a user can control and obtain real-time properties from other objects such as stream 1002, park 1003, at least one lighting devices 1004, at least one cameras 1005, at least one sensors 1006, and at least one video recording devices 1007. Real-time photo images, temperatures, and videos streams of 3D/360° map 1000 can be obtained so that real-time changes can be instantaneously detected. The display of observation point 1010 is made possible by data converter module 192. It is noted that voice commands and other controlling means such as bar codes and two dimensional bar codes such as QR codes, drop-down, pop-up menus, etc. can be used instead of cursor 1030.

Figure 11:
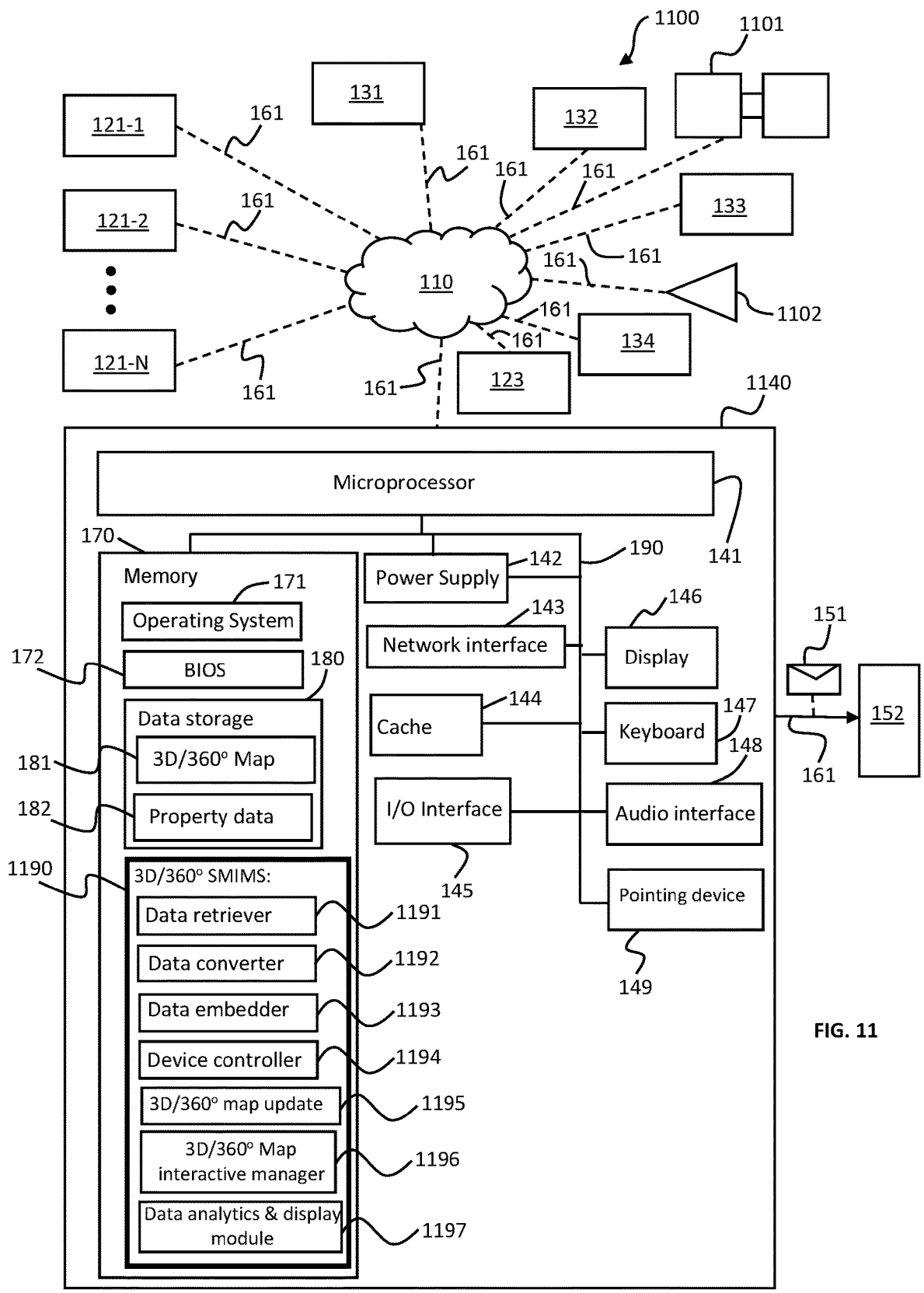
FIG. 11 is a hardware network system including network computer with a three-dimensional/360° degree smart management integrated mapping system (SMIMS) capable of updating the 3D/360° still map, displaying real-time full information, and controlling network-based devices in accordance with an exemplary embodiment of the present invention.

Next referring to FIG. 11, schematic diagram of a computer network system 1100 capable of displaying both real-time full information and real-time 3D/360° map in accordance with an embodiment of the present invention is illustrated. Computer network system 1100 includes the same elements as FIG. 1 plus at least one 3D laser scanners 1101, UAV, flycams, drones, or any flying objects 1102, and a server computer 1140. In one exemplary embodiment of the present invention, server computer 1140 further contains an SMIMS module 1190 which includes a data retriever module 1191, a data retriever module 1192, a data embedder module 1193, a device controller module 1194, a 3D map update module 1195, 3D/360° interactive manager module 1196, and data analytics and display module 1197. One change is detected by either at least one cameras 131 and/or at least one video recording devices 133, computing device 1141 sends out a command to the appropriate 3D laser scanners 1101 and/or UAVs, flycams, drones, and flying objects 1102 nearest to the changed object to start scanning. The newly scanned 3D/360° map is compared and update inside data storage 180. At this moment, processes 200-900 described above are repeated so that users e.g., group of client computers 121-1, 121-2, . . . , 121-N, and at least one client mobile devices 152 can have real-time 3D/360° map that constantly reflect up to date status of the surrounding areas.

Referring back to FIG. 10 again, a new building 1040 presented by dash lines is either built or destroyed by fires. At least one cameras 131 and/or at least one video recording devices 133 detect this change and alerts server computer 1140. Server computer 1140 sends out a command to the nearest 3D laser scanner 1101 and/or UAVs, flycams, drones, and flying objects 1102 to scan that targeted area. The changes defined by building 1040 are updated and recorded in permanent storage 180.

Figure 12:
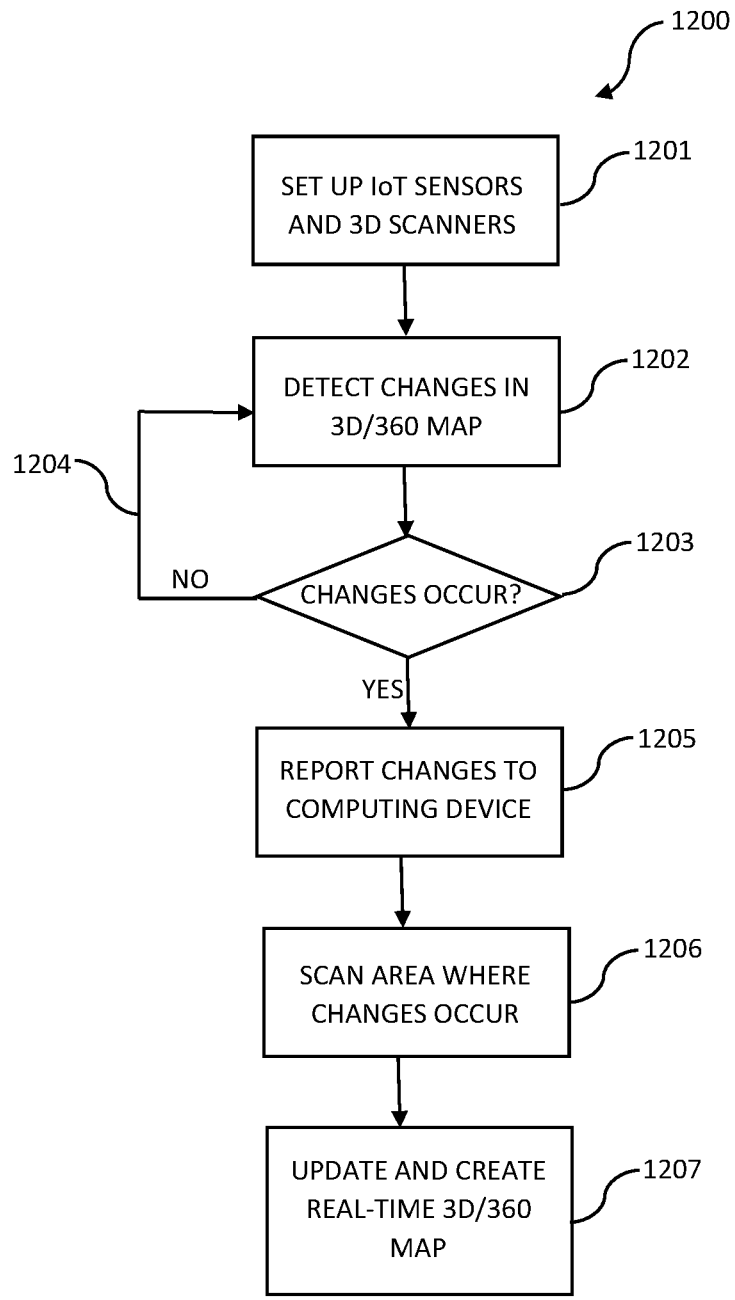
FIG. 12 is a flow chart illustrating a process for providing a real-time 3D/360 map from FIG. 2 in accordance with an embodiment of the present invention.

Finally, referring now to FIG. 12, a flowchart 1200 of a process for creating a real-time 3D/360 map using 3D scanners in an IoT network in accordance with an embodiment of the present invention is illustrated.

To begin, at step 1201, a network such as Internet of Things (IoT) network including 3D scanners, UAVs, flycams, drones, and flying objects 1102, and sensors are set up. Step 1201 is implemented by connecting at least one 3D laser scanners 1101 or 3D scanners, UAVs, flycams, drones, and flying objects 1102 to computer network system 1100 with SMIMS capability as described in FIG. 11. In one exemplary embodiment, 3D scanners are 3D laser scanners and/or UAV, drones, flycams, or any flying objects 1102. As disclosed in FIG. 11, 3D laser scanners 1101 are positioned at different locations inside 3D/360° map 1000.

Next at step 1202, changes are detected. Changes can be detected by either at least cameras 131 and/or video recording devices 133. In another exemplary embodiment, changes can be detected by periodical scanning of each section of 3D/360° map 1000. In details, as at least one cameras 131 and at least one video recording devices 133 stream live images via a network 110 such as IoT network, these images are compared with previous set of images. Thus, changes can be detected because each pixel has a particular coordinates (x,y,z).

At step 1203, determine whether changes occur. Step 1203 is realized by 3D/360° map update module 1195.

At step 1204, if no changes are detected then continue at step 1202 to sweep the area.

At step 1205, if changes are detected then report the changes by sending a command to server computer 1140.

At step 1206, the area where changes occur is scanned again. In one embodiment of the present invention, only the area of change is scanned again. Other 3D laser scanners 1110 in other locations do not have to scan to save time and cut costs.

Finally at step 1207, changes are updated and real-time 3D/360° map is created. As alluded above, because each pixel in 3D/360° map has precise (x,y,z) coordinates, changes can be updated in previous version of 3D/360° map 1000. Referring back to FIG. 10, updated building 1040 is updated at the correct (x,y,z) coordinates. Step 1207 is realized by 3D/360° map update module 1195.

From the disclosures above as illustrated in FIG. 1-FIG. 12, the present invention achieves the following objectives:

a 3D/360° real-time full information smart management integrated mapping system (SMIMS) that has the capability of generating a real-time 3D map with real-time information associated with each feature inside the real-time 3D map;

a 3D/360° real-time full information smart management integrated mapping system (SMIMS) that has the capability of generating a real-time 3D map with real-time information obtained from network-based sensors or from the Internet of Things (IoT);

a 3D/360° real-time full information smart management integrated mapping system (SMIMS) capable of connecting to existing various clients' databases including asset databases, operational databases, and system databases;

a 3D/360° real-time full information smart management integrated mapping system (SMIMS) capable of integrating with clients' programmable logic controllers (PLC) and a supervisory control and data acquisition (SCADA) software so that the 3D mapping and management system of the present invention can control and acquire data from the clients' sensors and devices such as lighting devices, cameras, actuators, 3D laser scanners, etc. via web-based interfaces;

a 3D/360° real-time full information smart management integrated mapping system (SMIMS) capable of having the flexibility in package installation and operation so that the 3D mapping and management system of the present invention can be hosted and ran on the clients' servers;

a 3D/360° real-time full information smart management integrated mapping system (SMIMS) capable of integrating with blockchains and artificial intelligence;

a 3D/360° real-time full information smart management integrated mapping system (SMIMS) that allows clients and developers to create 3D enterprise resource planning (ERP) platform and smart management;

a 3D/360° real-time full information smart management integrated mapping system (SMIMS) capable of setting up users' right classifications and portfolio management;

a 3D/360° real-time full information smart management integrated mapping system (SMIMS) capable of applying artificial intelligence (AI) engine such as computer vision, machine learning (ML), deep learning to perform auto-detection from real-time cameras and/or other imaging devices for security, fire detection, motion detection, and/or other useful purposes such as High Definition Survey (HDS), reality capture, volumetric surveys, facility management, marketing and proposals, forensics and security planning, education and entertainment, civil infrastructure, industrial applications, and heritage archeology;

a 3D/360° real-time full information smart management integrated mapping system (SMIMS) capable of tracking real-time location/movement of people and/or machines, equipments, objects within the covered geographical area by accessing GPS and/or other sensing devices from a user's mobile devices;

a 3D/360° real-time full information smart management integrated mapping system (SMIMS) configured to use QR code to obtain easy navigation and augmented reality (AR); and a 3D/360° real-time full information smart management integrated mapping system (SMIMS) capable of voice commanding for hand-free control.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of the present invention such as 3D/360° SMIMS 190 or 3D/360° SMIMS 1190 may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

DESCRIPTION OF NUMERALS 100 computer network system with a SMIMS module
110 a network such as internet
121-1 a first client's computer
121-2 a second client's computer
121-N an $N^{th}$ client's computer
123 clients' existing databases
131 at least one cameras
132 at least one lighting devices
133 at least one video recording devices
134 at least one sensors
140 server computer
141 microprocessor
142 power supply
143 network interface
144 non-transitive cache memory
145 input/output interface
146 display
147 keyboard
148 audio interface
149 pointing device driver
151 text message
152 at least one client mobile devices
161 communication link
162 computer bus
170 memory
171 operating system
172 BIOS
180 data storage
181 map storage
181-1 digitized 3D/360° still map stored in first storage
182 property data storage
190 3D/360° SMIMS module
191 data retriever module
192 device converter module
193 data embedder module
194 data controller module 195 3D/360° map interactive manager module
196 data analytics and display module
1001 buildings
1002 stream
1003 park
1005 cameras
1006 sensors
1007 video recording devices
1010 observation points
1020 displayed property of an object
1030 mouse cursor
1040 newly erected building
1100 real-time 3D/360o mapping and management system
1101 at least one 3D laser scanners
1102 UAV, flycams, or drones, or any flying objects
1140 server computer
1190 3D/360o interactive manager module
1191 data retriever module
1192 device converter module
1193 data embedder module
1194 data controller module
1195 3D/360° map update module
1196 3D/360° interactive map manager module
1197 Data analytics and display module

What is claimed is:

1. A method of generating and managing a three-dimensional-360 degrees (3D/3600) map of a geographical area, comprising:
generating said 3D/3600 map of said geographical area using at least one imaging devices and at least one flying means, wherein said 3D/3600 map comprises a plurality of objects and network-based devices different from said plurality of objects, wherein said plurality of objects and network-based devices are stationary and permanent elements of said geographical area captured in said 3D/3600 map;
using an application interface (API) to access remote client databases via a network and to obtain real-time properties associated with said plurality of objects and said network-based devices owned by said clients wherein using said API is based on determining data format of said plurality of objects and said network-based devices;
enabling controls of said network-based devices via said network;
embedding said real-time properties into said plurality of objects and said network-based devices located within said 3D/3600 map;
providing an interactive graphic user interface (GUI) to display said real-time properties and to control said network-based devices; and
displaying said real-time properties of any of said plurality of objects or said network-based devices when a user uses a pointing device to select any of said particular object or said particular network-based device.

2. The method of claim 1 wherein said step of generating said 3D/3600 map of said geographical area using at least one imaging devices further comprising:
generating three-dimensional 3D/3600 still maps using said at least one imaging devices;
generating a two-dimensional (2D) still maps said geographical area using at least one flying means; and
stitching said three-dimensional 3D/3600 still maps and said two-dimensional 2D still maps into said 3D/3600 still map of said geographical area.

3. The method of claim 1 wherein said step of accessing client databases to obtain real-time properties associated with said plurality of objects further comprises:
determining whether said client databases have provided a direct access or a remote access to obtain said real-time properties of said plurality of objects;
if said client databases have provided said direct access, then retrieving said realtime properties of said plurality of objects; otherwise, checking a data format of said realtime properties of said plurality of objects, if said data format is correct then retrieving using said API and storing said real-time properties of said plurality of objects into said storage via said network.

4. The method of claim 1 wherein said network-based devices further comprises at least one lighting devices, at least one sensors, at least one cameras, at least one video recording devices, and at least one actuators; and wherein said controls of said network-based devices via said network further comprises:
establishing communication links to said network-based devices; and
determining whether interrupts occur, if not allowing said user to receive real-time imagery from said at least one lighting devices, said at least one sensors, at least one actuators, at least one cameras, and at least one video recording devices via said network; if said interrupts occur, repeating said establishing communication links with different network-based devices and/or repeating said determining interrupts occurring step.

5. The method of claim 4 wherein said controls of said network-based devices via said network further comprises:
constantly receiving said real-time properties from said network-based devices;
formatting said real-time properties of said network-based devices in form of a frame text having a predetermined data structure; and
checking if said frame text conforms to said correct predetermined data structure: if said frame text conforms to said predetermined data structure, then transmitting and recording said real-time properties of said network-based devices via said network, if not then continue to receive said real-time properties of said network-based devices.

6. The method of claim 5 wherein said network comprises an Internet of Things (IoT), a hard drive, a master-slave configuration, and a cloud-network.

7. The method of claim 1 wherein said step of embedding said real-time properties of said plurality of objects and said network-based devices into said plurality of objects located within said 3D/3600 map further comprising:
assigning a first identification (ID) to each of said plurality of objects and said network-based devices;
assigning a second ID to said real-time properties associated with said plurality of objects and said network-based devices; and
selecting said real-time properties when said first identification is matched with said second identification.

8. The method of claim 1 wherein said accessing client databases to obtain real-time properties associated with said network-based devices and storing said real-time properties of said network-based devices into a storage via a network further comprises:
determining whether said client databases have provided a direct access or a remote access to obtain said real-time properties of said network-based devices;
if said client databases have provided said direct access, then retrieving said realtime properties of said network-based devices; otherwise, checking a data format of said real-time properties of said network-based devices, if said data format is correct then retrieve using said API store said real-time properties of said network-based devices into said storage via said network.

9. The method of claim 1 further comprising:
generating a second plurality of objects using said at least imaging devices;
comparing said second plurality of objects with said plurality of objects;
detecting differences between said plurality of objects and said second plurality of objects;
combining said differences into said plurality of objects to generate an update realtime 3D/3600 still map; and
displaying said update real-time 3D/3600 still map.

10. The method of claim 1 wherein said step of embedding said real-time properties into said plurality of objects located within said 3D/3600 map further comprises:
generating a plurality of observation points each having an x-y-z coordinates on each of said plurality of objects; and
fixedly attaching said plurality of observation points to said 3D/3600 still map so that when said user changes a view of said 3D/3600 still map, said plurality of observation points moves along accordingly without changing said x-y-z coordinates related to said 3D/3600 still map.

11. A computer network system, comprising:
a plurality of network-based devices;
at least one imaging devices for generating said 3D/3600 still map of property geographical area;
a storage for storing said 3D/3600 still map and real-time properties of a plurality of objects and network-based devices different from said plurality of objects, wherein said plurality of objects and network-based devices are stationary and permanent elements of said geographical area captured in said 3D/3600 map;
a smart management integrated mapping module (SMIM) comprising:
a data retriever module configured to use an application interface (API) to access remote client databases to obtain real-time properties associated with said plurality of objects and said network-based devices owned by said clients wherein using said API is based on determining data format of said plurality of objects and said network-based devices and store said real-time properties into said storage via a network;
device controller module configured to control operations and obtain said real-time properties of said plurality of network-based devices;
a data embedder module configured to embed said real-time properties into a plurality of observation points located on said real-time 3D/3600 map;
a data converter module configured to render said real-time properties into displayable images;
an interactive manager module configured to provide an interactive graphic user interface (GUI) to users so that users can control said plurality of network-based devices and view said plurality of real-time properties; and
a display and analytics module configured to display real-time properties of a particular object when said user using a pointing device to select one of said plurality of objects and display realtime imagery from said plurality of network-based devices.

12. The computer network system of claim 11 further wherein said smart management integrated mapping module (SMIM) further comprises a map update module configured to:
generating a second plurality of objects using said at least one imaging devices;
comparing said second plurality of objects with said plurality of objects;
detecting differences between said plurality of objects and said second plurality of objects; and
combining said differences into said plurality of objects to generate an update realtime 3D/3600 still map; and
updating said update real-time 3D/3600 still map.

13. The computer network system of claim 12 wherein said at least one imaging devices is selected from at least one digital cameras, at least one 3D scanners, at least one video recording devices, and at least one flycams.

14. The computer network system of claim 13 wherein said network comprises an Internet of Things (IoT).

15. A computer software program stored in a non-transitory computer readable medium for executing a microprocessor in a computer network system to perform an image process, comprising:
generating and displaying a smart management integrated mapping system (SMIMS) interface on a display screen of said computer network system;
displaying an 3D/3600 still map of a geographical area including a plurality of objects and network-based devices different from said plurality of objects, wherein said plurality of objects and network-based devices are stationary and permanent elements of said geographical area captured in said 3D/3600 map;
displaying real-time properties associated with said plurality of objects when a user selects a particular object when a user selects a particular object among said plurality of objects using an interactive graphic user interface (GUI) of said SMIMS interface;
controlling and displaying a real-time imagery obtained from network-based devices when said user selects a particular network-based device among said network-based devices using said interactive graphic user interface (GUI) of said SMIMS interface,
wherein said interactive management function is operable to perform:
generating said 3D/3600 map of said geographical area using at least one imaging devices and at least one flying means;
accessing remote client databases using an application interface (API) to obtain real-time properties associated with said plurality of objects and said network-based devices owned by said clients wherein using said API is based on determining data format of said plurality of objects and said network-based devices and storing said real-time properties into a storage via a network;
enabling controls of said network-based devices via said network;
embedding said real-time properties into said plurality of objects located within said 3D/3600 map; and
providing said interactive graphic user interface (GUI) to display said real-time properties as a user moves a pointing device to one of said plurality of objects and to control said network-based devices.

16. The computer software program of claim 15 wherein said step of generating said 3D/3600 map of said geographical area using at least one imaging devices further comprising:

generating three-dimensional 3D/3600 maps using said at least one imaging devices;

generating two-dimensional (2D) still maps said geographical area using at least one flying means; and stitching said three-dimensional 3D/3600 maps and said 2D still maps into said 3D/3600 still map of said geographical area.

17. The computer software program of claim 15 wherein said step of accessing client databases to obtain real-time properties associated with said plurality of objects further comprises:

determining whether said client databases have provided a direct access or a remote access to obtain said real-time properties of said plurality of objects and said network-based devices;

if said client databases have provided said direct access, then retrieving said realtime properties of said plurality of objects and said network-based devices; otherwise, checking a data format of said real-time properties of said plurality of objects and said network-based devices, if said data format is correct then retrieving using said API and storing said real-time properties of said plurality of objects and said network-based devices into said storage via said network.

18. The method of claim 15 wherein said network-based devices further comprises at least one lighting devices, at least one sensors, at least one cameras, at least one video recording devices, and at least one actuators; and wherein said controls of said network-based devices via said network further comprises:

establishing communication links to said network-based devices; and determining whether interrupts occur, if not allowing said user to receive real-time imagery from said at least one lighting devices, said at least one sensors, at least one actuators, at least one cameras, and at least one video recording devices via said network; if said interrupts occur, repeating said establishing communication links with different network-based devices and/or repeating said determining interrupts occurring step.

19. The computer software program of claim 15 wherein said controls of said network-based devices via said network further comprises:

constantly receiving said real-time properties from said plurality of objects and said network-based devices;

formatting said real-time properties in form of a frame text having a predetermined data structure; and checking if said frame text conforms to said correct predetermined data structure: if said frame text conforms to said predetermined data structure, then transmitting and recording said real-time properties via said network, if not then continue to receive said real-time properties of said plurality of objects and said network-based devices;

wherein said step of embedding said real-time properties into said plurality of objects and said network-based devices located within said 3D/3600 map further comprising:

assigning a first identification (ID) to each of said plurality of objects;

assigning a second ID to said real-time properties associated with said plurality of objects and said network-based devices; and selecting said real-time properties when said first identification is matched with said second identification.

20. The computer software program of claim 15 further comprising:

generating a second plurality of objects using said at least imaging devices;

comparing said second plurality of objects with said plurality of objects;

detecting differences between said plurality of objects and said second plurality of objects;

combining said differences into said plurality of objects to generate an update realtime 3D/3600 still map; and displaying said update real-time 3D/3600 still map.

* * * * *